(12) United States Patent
Gao et al.

(10) Patent No.: US 11,741,581 B2
(45) Date of Patent: Aug. 29, 2023

(54) TRAINING METHOD FOR IMAGE PROCESSING MODEL, IMAGE PROCESSING METHOD, NETWORK DEVICE, AND STORAGE MEDIUM

(71) Applicant: TENCENT TECHNOLOGY (SHENZHEN) COMPANY LIMITED, Shenzhen (CN)

(72) Inventors: Hongyun Gao, Shenzhen (CN); Xin Tao, Shenzhen (CN); Jiaya Jia, Shenzhen (CN); Yuwing Tai, Shenzhen (CN); Xiaoyong Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 274 days.

(21) Appl. No.: 17/332,970

(22) Filed: May 27, 2021

(65) Prior Publication Data

US 2021/0287047 A1    Sep. 16, 2021

Related U.S. Application Data

(63) Continuation of application No. PCT/CN2020/077699, filed on Mar. 4, 2020.

(30) Foreign Application Priority Data

Apr. 1, 2019   (CN) .......................... 201910259016.7

(51) Int. Cl.
*G06K 9/00*   (2022.01)
*G06T 5/00*   (2006.01)
(Continued)

(52) U.S. Cl.
CPC .......... *G06T 5/003* (2013.01); *G06F 18/2148* (2023.01); *G06T 3/4046* (2013.01);
(Continued)

(58) Field of Classification Search
CPC ......... G06T 5/003; G06T 3/4046; G06T 5/50; G06T 2207/20016; G06T 2207/20081;
(Continued)

(56) References Cited

U.S. PATENT DOCUMENTS

2002/0114534 A1   8/2002   Nakamura et al.
2011/0229044 A1   9/2011   Yang et al.
(Continued)

FOREIGN PATENT DOCUMENTS

CN   108399362 A   8/2018
CN   108629743 A   10/2018
(Continued)

OTHER PUBLICATIONS

Liu, Jing, Wanning Sun, and Mengjie Li. "Recurrent conditional generative adversarial network for image deblurring." IEEE Access 7 (2018): 6186-6193. (Year: 2018).*

(Continued)

*Primary Examiner* — Jonathan S Lee
(74) *Attorney, Agent, or Firm* — Anova Law Group, PLLC

(57) ABSTRACT

Embodiments of this application disclose a training method using image processing model for processing blurry images. The method includes obtaining a sample pair comprising a clear image and a corresponding blurry image; the sharpness of the clear image being greater than a preset threshold, the sharpness of the blurry image being less than the preset threshold; activating the image processing model to perform sharpness restoration on the blurry image to obtain a restored image; and updating network parameters of a first network and network parameters of a second network in the image processing model according to the restored image and the clear image to obtain a trained image processing model; the network parameters of the first network and the network
(Continued)

parameters of the second network meeting a selective sharing condition indicating whether the network parameters between the first network and the second network are shared or independent.

20 Claims, 9 Drawing Sheets

(51) Int. Cl.
    *G06T 3/40*     (2006.01)
    *G06T 5/50*     (2006.01)
    *G06V 10/94*     (2022.01)
    *G06F 18/214*     (2023.01)
    *G06V 10/764*     (2022.01)
    *G06V 10/82*     (2022.01)

(52) U.S. Cl.
    CPC .............. *G06T 5/50* (2013.01); *G06V 10/764* (2022.01); *G06V 10/82* (2022.01); *G06V 10/95* (2022.01); *G06T 2207/20016* (2013.01); *G06T 2207/20081* (2013.01); *G06T 2207/20084* (2013.01)

(58) Field of Classification Search
    CPC .......... G06T 2207/20084; G06V 10/82; G06V 10/95; G06V 10/764; G06F 18/2148
    USPC ......................................................... 382/157
    See application file for complete search history.

(56) References Cited

U.S. PATENT DOCUMENTS

| | | | |
|---|---|---|---|
| 2016/0379352 | A1 | 12/2016 | Zhang et al. |
| 2017/0351935 | A1 | 12/2017 | Liu et al. |
| 2020/0349680 | A1 | 11/2020 | Tao et al. |

FOREIGN PATENT DOCUMENTS

| | | |
|---|---|---|
| CN | 108846820 A | 11/2018 |
| CN | 109360171 A | 2/2019 |
| CN | 109993712 A | 7/2019 |
| JP | 2002170112 A | 6/2002 |
| KR | 20170000767 A | 1/2017 |
| WO | 2017209307 A1 | 12/2017 |

OTHER PUBLICATIONS

Su, Shuochen, et al. "Deep video deblurring for hand-held cameras." Proceedings of the IEEE conference on computer vision and pattern recognition. 2017. (Year: 2017).*

Chrysos, Grigorios G., Paolo Favaro, and Stefanos Zafeiriou. "Motion deblurring of faces." International journal of computer vision 127. 6-7 (2019): 801-823. (Year: 2019).*

Zhang, Xinyi, et al. "A deep encoder-decoder networks for joint deblurring and super-resolution." 2018 IEEE international conference on acoustics, speech and signal processing (ICASSP). IEEE, 2018. (Year: 2018).*

The European Patent Office (EPO) The Extended European Search Report for 20783018.3 May 6, 2022 11 Pages.

Hongyun Gao et al., "Dynamic Scene Deblurring With Parameter Selective Sharing and Nested Skip Connections," 2019 IEEE/CVF Conference on Computer Vision and Pattern Recognition (CVPR), IEEE, Jun. 15, 2019 (Jun. 15, 2019), pp. 3843-3851. 9 pages.

Xiao-Jiao Mao et al., "Image Restoration Using Very Deep Convolutional Encoder-Decoder Networks with Symmetric Skip Connections," arXiv:1603.09056v2, Sep. 1, 2016 (Sep. 1, 2016), pp. 1-9. 9 pages.

Seungjun Nah et al., "Deep Multi-scale Convolutional Neural Network for Dynamic Scene Deblurring," 2017 IEEE Conference on Computer Vision and Pattern Recognition (CVPR), IEEE Computer Society, US, Jul. 21, 2017 (Jul. 21, 2017), pp. 257-265, 9 pages.

Dixiu Xue et al., "Research on Cancer Image Recognition based on Convolutional Neural Networks", May 2017, University of Science and Technology of China.

Junqian Wang et al., "Research on Person Re-Identification Based on Multi-Task Joint Supervised Learning", Jun. 2018, Harbin Institute of Technology.

Xu Cheng et al., "Object tracking algorithm based on multiple loss generative adversary", May 2018, vol. 48, No. 3, Journal of Southeast University/.

The China National Inteli Fctual Property Administration (CNIPA) The First Office Action for Chinese Application 201910259016.7 Sep. 22, 2022 31 Pages (With Translation).

The World Intellectual Property Organization (WIPO) International Search Report for PCT/CN2020/077699 Aug. 12, 2020 5 Pages (including translation).

Xin Tao et al., "Scale-recurrent Network for Deep Image Deblurring," 2018IEEE/CVF Conference on Computer Vision and Pattern Recognition, Jun. 23, 2018 (Jun. 23, 2018), pp. 8174-8182. 9 pages.

Korean Intellectual Property Office (KIPO) Office Action 1 for 10-2021-7020255 Jul. 6, 2022 15 Pages (including translation).

Xin Tao et al., "Scale-recurrent Network for Deep Image Deblurring," 2018 IEEE/CVF Conference on Computer Vision and Pattern Recognition, Jun. 18, 2018 (Jun. 18, 2018), pp. 8174-8182. 9 pages.

Seungjun Nah et al., "Deep Multi-scale Convolutional Neural Network for Dynamic Scene Deblurring," arXiv:1612.02177v1, Dec. 7, 2016. 21 pages.

The Japan Patent Office (JPO) Notification of Reasons for Refusal for Application No. 2021-529409 Jul. 26, 2022 16 pages (including translation).

* cited by examiner

Blurry images at different scales | Images in a foreground region | Images in a background region

TRAINING METHOD FOR IMAGE PROCESSING MODEL, IMAGE PROCESSING METHOD, NETWORK DEVICE, AND STORAGE MEDIUM

RELATED APPLICATIONS

This application is a continuation application of PCT Application No. PCT/CN2020/077699, entitled "METHOD FOR TRAINING IMAGE PROCESSING MODEL, IMAGE PROCESSING METHOD, NETWORK DEVICE, AND STORAGE MEDIUM" and filed on Mar. 4, 2020, which claims priority to Chinese Patent Application No. 201910259016.7, entitled "TRAINING METHOD FOR IMAGE PROCESSING MODEL, IMAGE PROCESSING METHOD, AND RELATED DEVICE", and filed with the National Intellectual Property Administration, PRC on Apr. 1, 2019. The two applications are both incorporated herein by reference in their entirety.

FIELD OF THE TECHNOLOGY

This application relates to the field of Internet technologies, specifically, to the field of image processing technologies, and in particular, to a training method for an image processing model for processing blurry images, an image processing method, a training apparatus for an image processing model for processing blurry images, an image processing apparatus, a network device, and a computer storage medium.

BACKGROUND OF THE DISCLOSURE

Image deblurring is an important research direction of image processing, and aims to restore detail information lost in blurry images. With the research advancement of neural network models, image deblurring methods based on an image processing model have achieved better effects than conventional methods. The image processing model is a neural network model used for performing image deblurring on the blurry images to obtain clear images. How to obtain an image processing model with perfect performance through model training is particularly important for the effect of subsequent image deblurring. In existing model training methods, it is generally considered that a blurry image is composed of a plurality of different blurry regions, and convolution model assumptions are applied on the different blurry regions to restore the different blurry regions to clear images in the different regions respectively, to further train the image processing model. Specifically, it is necessary to segment the blurry image into different regions first, then continuously perform two operations of iterative convolution kernel estimation and image deconvolution on the different regions to gradually optimize a deblurring effect of each region, and finally synthesize the regions after deblurring to obtain a complete clear image.

SUMMARY

An embodiment of this application provides a training method for an image processing model for processing blurry images, performed by a network device, the image processing model comprising a first network and a second network; the first network and the second network being codec networks with different scales; the sizes of the scales corresponding to the measurements of the sharpness of to-be-processed blurry images. The method includes obtaining a sample pair for training, the sample pair comprising a clear image and a blurry image corresponding to the clear image; and the sharpness of the clear image being greater than a preset threshold, and the sharpness of the blurry image being less than the preset threshold; activating the image processing model to perform sharpness restoration on the blurry image to obtain a restored image; and updating network parameters of the first network and network parameters of the second network in the image processing model according to the restored image and the clear image to obtain a trained image processing model. The network parameters of the first network and the network parameters of the second network meet a selective sharing condition, and the selective sharing condition indicate the network parameters between the first network and the second network are shared or independent.

An embodiment of this application further provides an image processing method, performed by a network device. The method includes obtaining a to-be-processed original image, the sharpness of the original image being less than a preset threshold; activating an image processing model for processing blurry images to perform sharpness restoration on the original image to obtain a target image, the sharpness of the target image being greater than the preset threshold, the image processing model at least comprising a first network and a second network; the first network and the second network being codec networks with different scales; the sizes of the scales corresponding to the measurements of the sharpness of to-be-processed blurry images; and the network parameters of the first network and the network parameters of the second network meeting a selective sharing condition, and the selective sharing condition indicating the network parameters between the first network and the second network are shared or independent; and outputting the target image.

An embodiment of this application provides a training apparatus for an image processing model for processing blurry images, the image processing model comprising a first network and a second network; the first network and the second network being codec networks with different scales; the sizes of the scales corresponding to the measurements of the sharpness of to-be-processed blurry images. The apparatus includes comprising a processor, and a memory connected to the processor, the memory storing machine-readable instructions, and the machine-readable instructions being executable by the processor to: obtain a sample pair for training, the sample pair comprising a clear image and a blurry image corresponding to the clear image; and the sharpness of the clear image being greater than a preset threshold, and the sharpness of the blurry image being less than the preset threshold; activate the image processing model to perform sharpness restoration on the blurry image to obtain a restored image; and update network parameters of the first network and network parameters of the second network in the image processing model according to the restored image and the clear image to obtain a trained image processing model. The network parameters of the first network and the network parameters of the second network meet a selective sharing condition, and the selective sharing condition indicating the network parameters between the first network and the second network, are shared or independent.

An embodiment of this application further provides a non-transitory computer-readable storage medium, storing a plurality of instructions, the instructions being configured to be loaded by a processor, to perform the training method for an image processing model and the image processing method according to the embodiments of this application.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
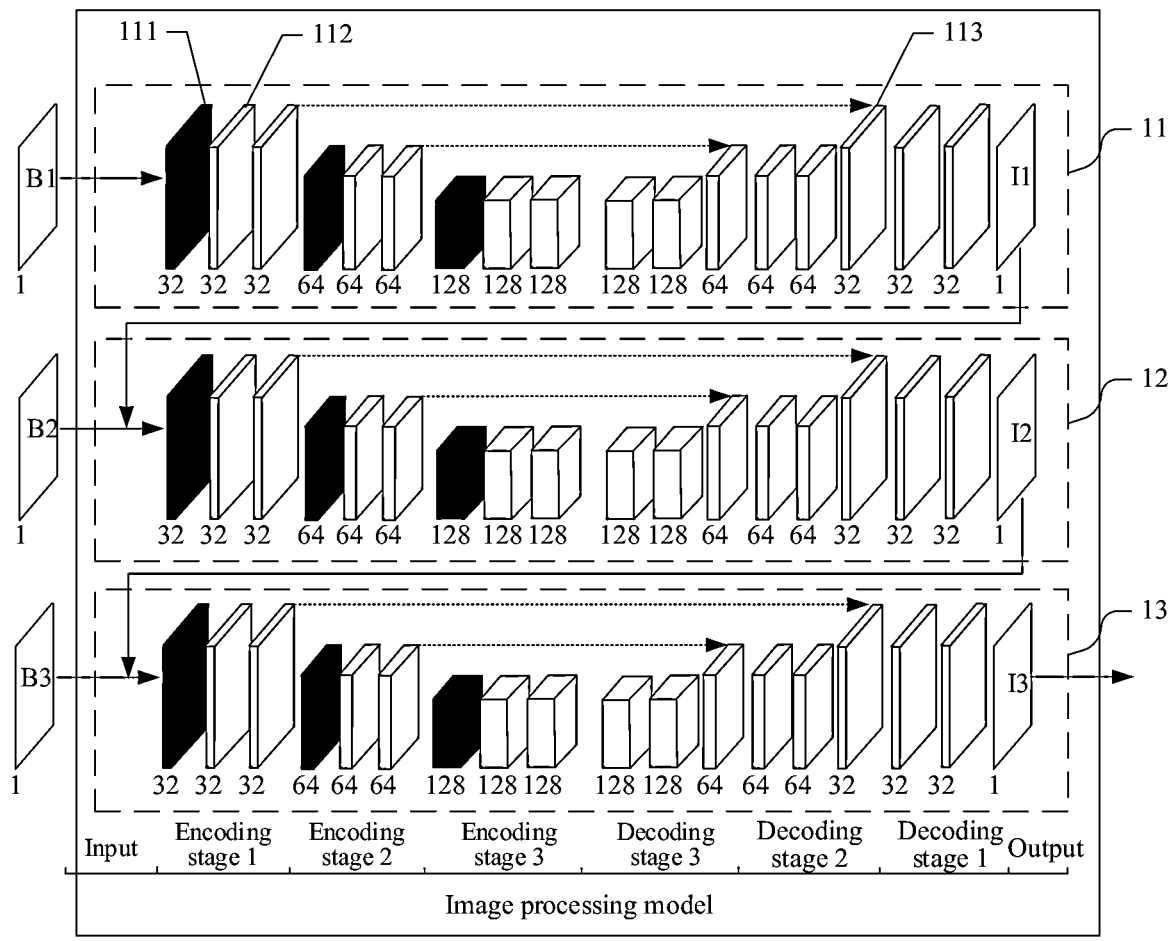
FIG. 1 is a schematic structural diagram of an image processing model according to an embodiment of this application.

The following clearly and completely describes technical solutions in embodiments of this application with reference to the accompanying drawings in the embodiments of this application.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, an audio processing technology, a natural language processing technology, and machine learning/deep learning.

Currently, deep learning is a technology of machine learning and one of research fields. Artificial intelligence (AI) is implemented in a computer system by building an artificial neural network with a hierarchical structure.

Due to successful application of deep learning (DL) in the field of vision, researchers also introduce the DL to the field of image processing. A deep learning neural network model is trained by using a large quantity of training images to enable the model to perform image processing, for example, process blurry images.

Image blurring is a common problem in image capture. In an example, when a user is in a dynamic scene or a relatively dark environment, a movement of an object in the dynamic scene and/or a movement of a recording camera may cause images obtained by recording to be blurry to various degrees. In another example, when a user records a target object, slight shaking of a hand of the user may also cause images obtained by recording to be blurry to various degrees. When facing a blurry image obtained by recording, the user usually chooses to re-record to obtain a clear image. The blurry image herein refers to an image of which the sharpness is less than a preset threshold, and the clear image refers to an image of which the sharpness is greater than the preset threshold. The sharpness refers to a degree of clearness of detail textures and borders thereof in the image. However, due to various factors such as camera movement, object movement, and hand shaking, the user still cannot obtain a clear image after a plurality of times of re-recording. In addition, in some recording scenes of instantaneous snapshots, a user usually does not have a second chance of recording. For example, in a scene of recording a landscape outside a window on a high-speed moving car/train, or in a scene of recording a fast-moving object in a static scene, the user does not have a chance of re-recording.

In the process of processing a blurry image, because an actual recording scene of the blurry image is extremely complex, including a plurality of factors such as camera movement and object movement in a recording scene, existing model training methods cannot satisfy convolution model assumptions on all blurry regions in movement, resulting in poor image deblurring performance of the image processing model obtained through training. Moreover, model training requires the processing on the blurry image of first segmenting, then calculating respectively, and finally synthesizing, which has a low model training efficiency.

Based on this, an embodiment of this application provides an image processing model for processing blurry images.

The image processing model may be used for performing sharpness restoration on a blurry image to obtain a clear image.

The image processing model for processing blurry images provided In one embodiment consistent with the present disclosure may be formed by sequentially connecting at least two networks with different scales in series according to the scales in descending order or in ascending order, and the networks with different scales may perform sharpness restoration on blurry images with different sharpness. The scales of the networks are used for indicating the levels of the sharpness of images inputted to the networks, that is, the sizes of the scales correspond to the measurements of the sharpness of to-be-processed blurry images. A coarse scale represents that an original blurry image is downsampled to a lower resolution to obtain an image with higher sharpness, and a blur degree of the image is relatively low. A fine scale represents that the original blurry image is downsampled to a higher resolution to obtain an image with lower sharpness, and the blur degree of the image is relatively high. Referring to FIG. 1 (an example in which an image processing model includes three networks is used for description in FIG. 1), the image processing model may include such three networks with different scales as a coarse-scale network 11, a middle-scale network 12, and a fine-scale network 13. In the three networks with different scales, the scale of the coarse-scale network 11 is the largest, the scale of the middle-scale network 12 is the second largest, and the scale of the fine-scale network 13 is the smallest. Each network is an codec network, which may specifically include a plurality of feature extraction units 111 (as shown in black units in FIG. 1), a plurality of feature transformation units 112 (as shown in gray units in FIG. 1), and a plurality of feature reconstruction units 113 (as shown in white units in FIG. 1) that have different channel quantities. The channel quantity of each unit may be set according to an empirical value or service requirements, for example, setting to 32 channels, 64 channels, 128 channels, and the like. In some embodiments, each of the feature extraction units 111, the feature transformation units 112, and the feature reconstruction units 113 may include one or more convolutional layers, and each convolutional layer may include two convolution kernels of 3×3. The parameter quantity may be reduced by using the two convolution kernels of 3×3 to improve the speed of model training. FIG. 1 only schematically represents a structure of the image processing model, and does not limit the structure of the image processing model provided In one embodiment consistent with the present disclosure. In an example, the network quantity in the image processing model is not limited to 3 shown in FIG. 1, but may alternatively be 2, 4, or the like. In another example, each convolutional layer may alternatively include three convolution kernels of 3×3 or one convolution kernels of 5×5.

Figure 2A:
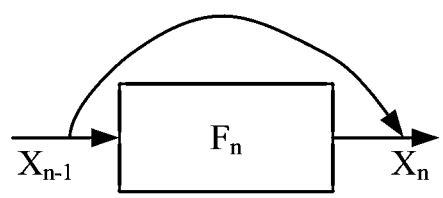
FIG. 2A is a schematic structural diagram of a first-order residual function according to an embodiment of this application.
Figure 2B:
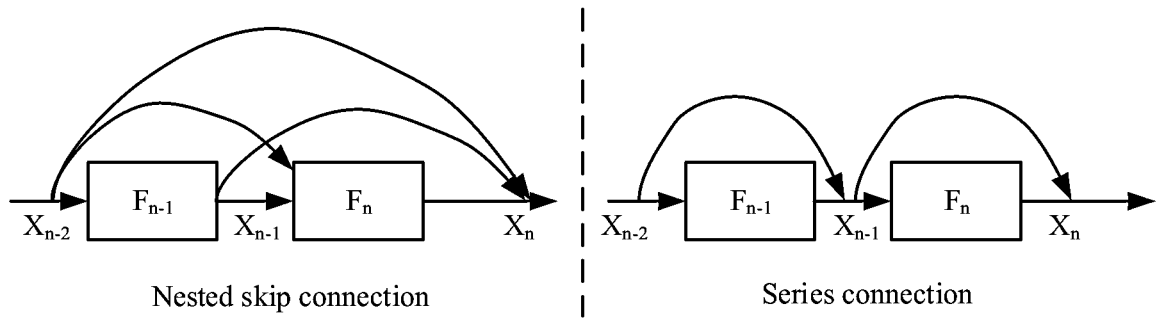
FIG. 2B is a schematic diagram of a comparison between a second-order nested skip connection structure corresponding to a second-order residual function and a series connection structure according to an embodiment of this application.

Network parameters of the feature extraction units 111 in any two networks are independent, and/or network parameters of the feature reconstruction units 113 in any two networks are independent. Network parameters of the feature transformation units 112 in any two networks are shared. In some embodiments, the feature transformation unit 112 may include at least two residual units, each residual unit may include two or more convolutional layers, and the residual units may be connected to each other by using a multi-order nested skip connection structure. A residual unit may be defined with reference to formula 1.1:

$$x_n = x_{n-1} + F_n(x_{n-1})$$ Formula 1.1 where, $x_{n-1}$, $x_n$, and $F_n$ represent an input, an output, and a residual function of an $n^{th}$ residual unit; and formula 1.1 may also be referred to as a first-order residual function corresponding to a structure shown in FIG. 2A. In one embodiment consistent with the present disclosure, assuming that an input of an $(n-1)^{th}$ another residual unit is also generated by another residual function, the input is substituted into formula 1.1 to obtain a second-order residual function shown in formula 1.2 corresponding to a second-order nested skip connection structure shown in a schematic structural diagram on the left side in FIG. 2B. In addition, it may be learned by comparing schematic structural diagrams on the left and right sides in FIG. 2B that, compared with directly connecting two residual units in series in the related art, the second-order nested skip connection structure provided In one embodiment consistent with the present disclosure has one more connection.

$$x_n = x_{n-2} + F_{n-1}(x_{n-2}) + F_n(x_{n-2} + F_{n-1}(x_{n-2}))$$ Formula 1.2

Figure 2C:
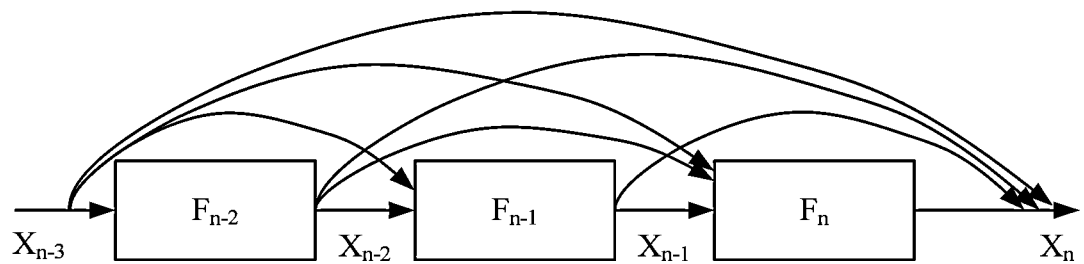
FIG. 2C is a schematic structural diagram of a third-order nested skip connection structure corresponding to a third-order residual function according to an embodiment of this application.

Formula 1.2 is expanded to further obtain a third-order residual function shown in formula 1.3 corresponding to a third-order nested skip connection structure shown in FIG. 2C.

$$x_n = x_{n-3} + F_{n-2}(x_{n-3}) + (x_{n-3} + F_{n-2}(x_{n-3})) + F_n(x_{n-3} + F_{n-2}(x_{n-3}) + (x_{n-3} + F_{n-2}(x_{n-3})))$$ Formula 1.3

Figure 2D:
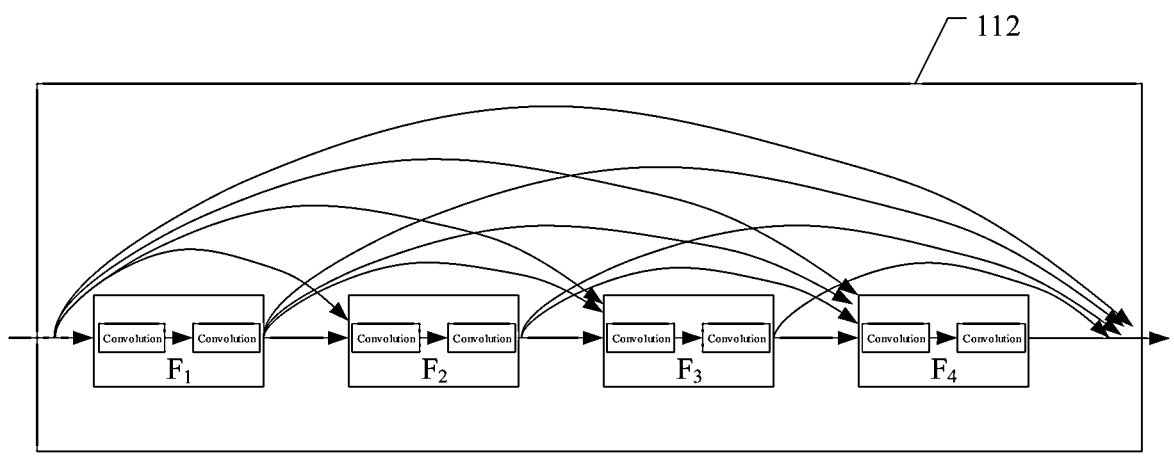
FIG. 2D is a schematic diagram of an internal structure of a feature transformation unit according to an embodiment of this application.

Similarly, a multi-order residual function and a corresponding multi-order nested skip connection structure may be obtained. The multi-order nested skip connection structure may be combined into a nested module to be embedded in the feature transformation unit, thereby improving gradient propagation and reducing the complexity of network parameter optimization. Taking an example in which the feature transformation unit 112 includes four residual units Fi, each residual unit includes two convolutional layers, and the residual units are connected to each other by using a fourth-order nested skip connection structure, a schematic structural diagram of the feature transformation unit 112 may be shown with reference to FIG. 2D. FIG. 2D is the schematic diagram of the internal structure of the feature transformation unit 112 in FIG. 1. FIG. 2D only schematically represents a structure of the feature transformation unit 112, and does not limit the structure of the feature transformation unit 112 provided In one embodiment consistent with the present disclosure. In an example, the quantity of the residual units in the feature transformation unit 112 is not limited to 4 shown in FIG. 2D, but may alternatively be 2, 5, or the like. In another example, each residual unit is not limited to only including two convolutional layers, but may alternatively include three, five, or more convolutional layers.

For the foregoing image processing model, an embodiment of this application further provides a model training solution to better train and update the image processing model, optimize the deblurring performance of the image processing model, and improve the efficiency of model training. When the model training solution is used for training and updating the image processing model, a blurry image and a clear image that are paired may be obtained; networks in the image processing model are sequentially called to perform sharpness restoration on the blurry image for training to obtain a restored image; and then network parameters of the networks in the image processing model are updated according to the restored image and the clear image. When each network performs sharpness restoration on an image, a plurality of encoding stages and a plurality of decoding stages may be included (three encoding stages and three decoding stages are used as an example for description in FIG. 1). In each encoding stage, the feature extraction unit 111 may be first called to perform feature extraction on a received image, and then the feature transformation unit 112 is called to perform feature transformation on an image obtained after the feature extraction. In each decoding stage, the feature transformation unit 112 may be first called to perform feature transformation on a received image, and then the feature reconstruction unit 113 is called to perform feature reconstruction on an image obtained after the feature transformation.

Based on the foregoing description, the embodiments of this application provide a training method and apparatus for an image processing model for processing blurry images, a network device, and a storage medium.

The training apparatus for an image processing model may be specifically integrated into the network device such as a terminal or a server. The terminal herein may include, but is not limited to: a smart terminal, a tablet computer, a laptop computer, a desktop computer, or the like. For example, referring to FIG. 3A, a network device 31 may obtain a sample pair for training, the sample pair including a clear image and a blurry image corresponding to the clear image; and the sharpness of the clear image being greater than a preset threshold, and the sharpness of the blurry image being less than the preset threshold; activate the image processing model to perform sharpness restoration on the blurry image to obtain a restored image; and update network parameters of the first network and/or network parameters of the second network in the image processing model according to the restored image and the clear image to obtain a trained image processing model.

A training method for an image processing model for processing blurry images provided in an embodiment of this application may be performed by a network device. Referring to FIG. 3B, the training method for an image processing model for processing blurry images may include the following steps S301 to S303:

S301. Obtain a sample pair for training, the sample pair including a clear image and a blurry image corresponding to the clear image.

When the sample pair for training is obtained, the clear image and the blurry image corresponding to the clear image may be obtained in a data-driven manner. The so-called data-driven manner refers to a manner of blurring a dynamic scene by superimposing a plurality of consecutive frames of images captured by a camera to obtain the blurry image and the clear image in the dynamic scene. The sharpness of the clear image is greater than a preset threshold, and the sharpness of the blurry image is less than the preset threshold. The preset threshold herein may be set according to an empirical value or actual service requirements (for example, the requirement on the accuracy of deblurring performance of the image processing model). The clear image and the blurry image that are paired are obtained in the data-driven manner, which may reduce the acquisition difficulty of the sample pair.

S302. Activate the image processing model to perform sharpness restoration on the blurry image to obtain a restored image.

In one embodiment consistent with the present disclosure, the image processing model at least includes a first network and a second network; and the first network and the second network are codec networks with different scales, the first network corresponds to a first scale, and the second network corresponds to a second scale. Values of the first scale and the second scale are different, and the value of the first scale may be greater than the value of the second scale, that is, the first scale may be a coarse scale, and the second scale may be a fine scale. When the image processing model is called to perform sharpness restoration on the blurry image, the first network and the second network may be sequentially called to perform sharpness restoration on the blurry image to obtain the restored image. If the image processing model further includes other networks such as a third network and a fourth network, the first network, the second network, and the other networks may be called to perform sharpness restoration on the blurry image.

The sharpness restoration herein refers to the processing of improving the sharpness of the image. FIG. 3C is a flowchart of sharpness restoration according to an embodiment of this application. In some embodiments, as shown in FIG. 3C, the following steps S321 to S323 are specifically included:

S321. Perform feature extraction on an image.

Specifically, a plurality of convolution operations may be performed on the image to implement the feature extraction on the image, or a feature extraction algorithm may be used to perform the feature extraction on the image. The feature extraction algorithm herein may include, but is not limited to: a local binary patterns (LBP) algorithm, a histogram of oriented gradient (HOG) feature extraction algorithm, a speeded up robust features (SURF) algorithm, or the like.

S322. Perform, by using a multi-order residual function, feature transformation on an image obtained after the feature extraction.

The multi-order residual function herein refers to a residual function of which an order is greater than or equal to 2.

S323. Perform feature reconstruction on an image obtained after the feature transformation.

Specifically, a plurality of deconvolution operations may be performed on the image obtained after the feature transformation to implement the feature reconstruction on the image obtained after the feature transformation.

S303. Update network parameters of the first network and/or network parameters of the second network in the image processing model according to the restored image and the clear image to obtain a trained image processing model.

Figure 4:
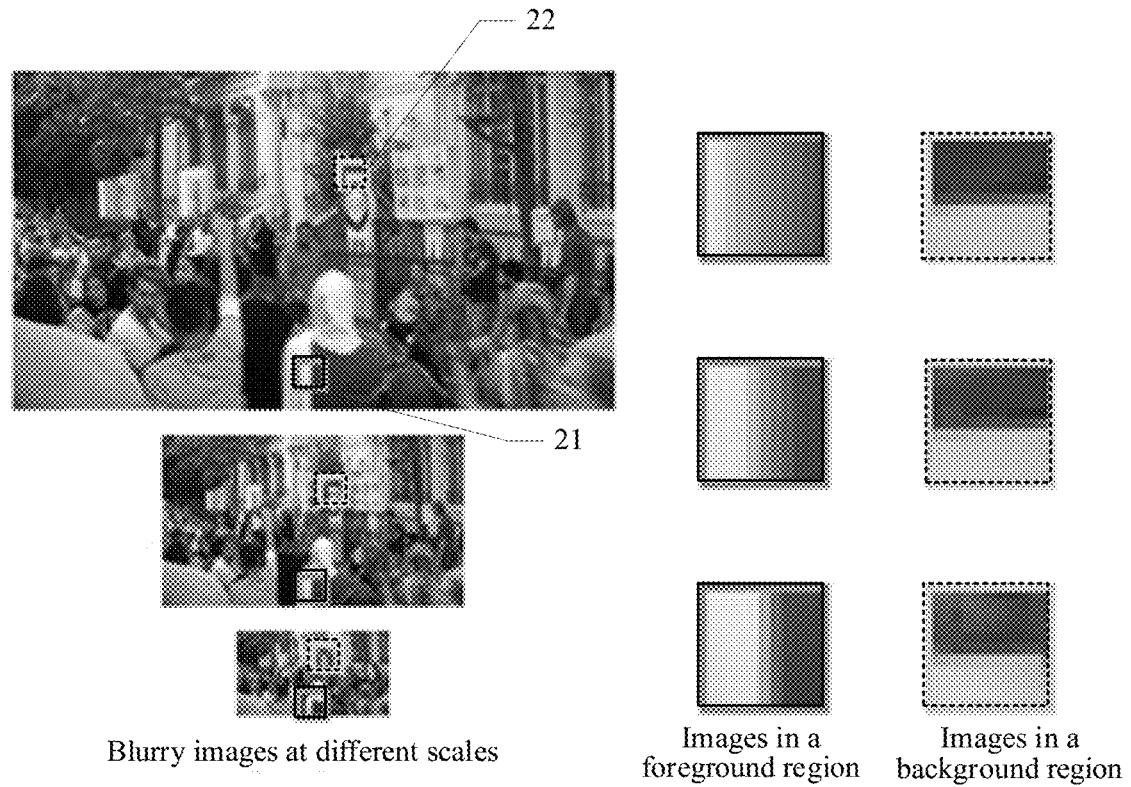
FIG. 4 is a schematic diagram of a research result of blurry images according to an embodiment of this application.

Through the study of blurry images (images shown on the left side in FIG. 4) captured in a dynamic scene, it is found that, in the images shown on the left side in FIG. 4, an image of a building part in a background region is relatively clear, while an image of a crowd part in a foreground region is relatively blurry. A blurry image region 21 in the foreground region and a clear image region 22 in the background region are randomly selected, and the two selected image regions are analyzed in an image pyramid. For an analysis result thereof, refer to the right side in FIG. 4. According to the analysis result shown on the right side in FIG. 4, it may be learned that, after the image region 22 in the background region is downsampled, edges of the image thereof are still clear after downsampling; and after the image region 21 in the foreground region is downsampled, edges of the image thereof become increasingly clear after downsampling. If the same feature extraction parameters are allocated to the networks with different scales in the image processing model, the image processing model cannot both extract clear image features and blurry image features. Therefore, in an embodiment of this application, different feature extraction parameters are allocated to feature extraction units of the networks with different scales, which enables the networks with different scales to learn important image information at the different scales, so as to extract more image features at the different scales.

Figure 5A:
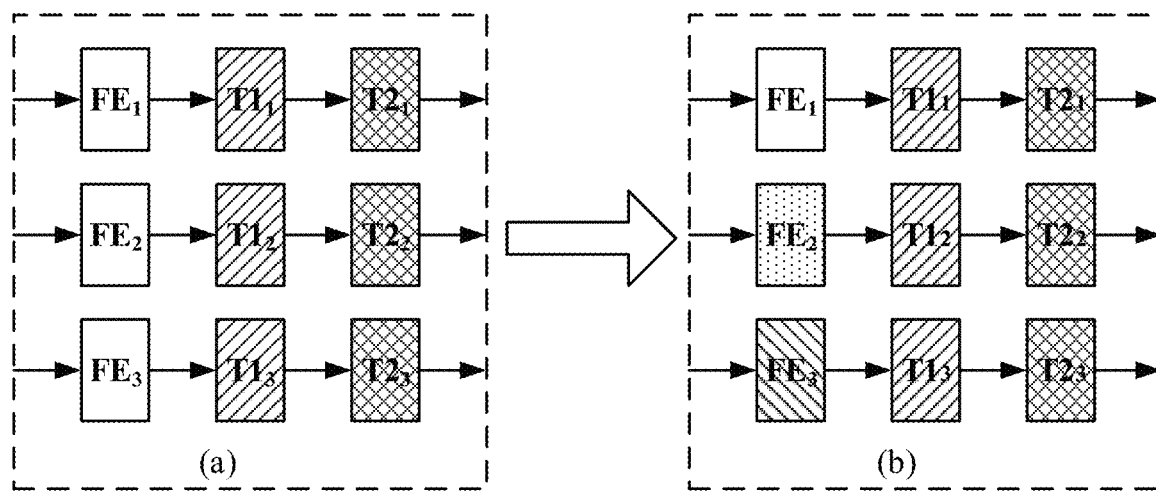
FIG. 5A is a schematic diagram of allocation of network parameters according to an embodiment of this application.
Figure 5B:
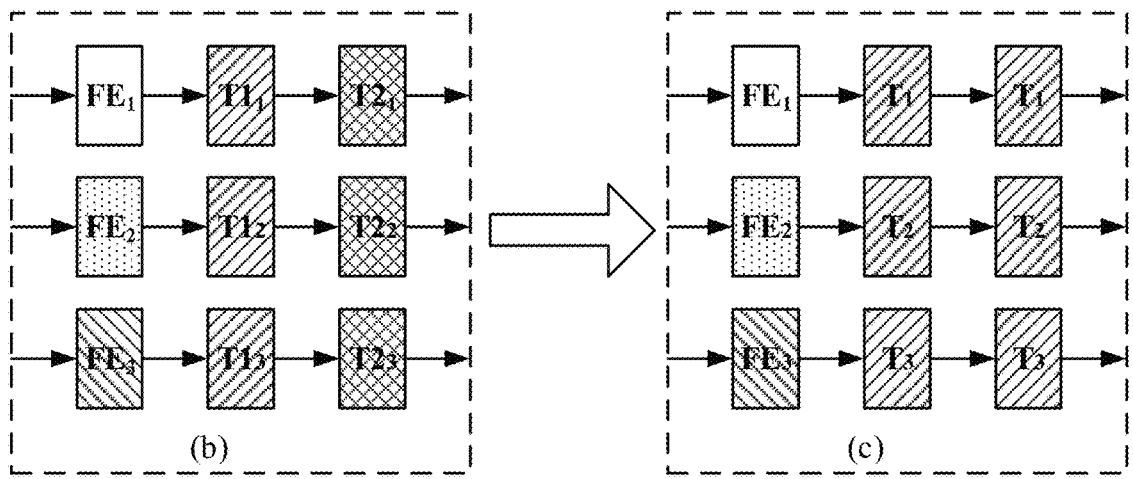
FIG. 5B is a schematic diagram of another allocation of network parameters according to an embodiment of this application.

Because feature transformation functions of the feature transformation units in the networks with different scales are similar, and all aim to transform corresponding blurry image features into clear image features, in an embodiment of this application, the same feature transformation parameters are allocated to feature transformation units of the networks with different scales, as shown in FIG. 5A. Three rows in FIG. 5A represent the three networks at the coarse scale to the fine scale respectively from top to bottom. FE represents a feature extraction unit, T represents a feature transformation unit, and the same background represents the same parameters. Further, because functions of the feature transformation at different scales and the same scale are similar, the same feature transformation parameters may be further allocated to the feature transformation units in the networks with the same scale, as shown in FIG. 5B. FIG. 5A and FIG. 5B only schematically represent encoding stages of the networks, and decoding stages thereof are not shown in FIG. 5A and FIG. 5B.

Based on the foregoing description, for the first network and the second network in the image processing model, the network parameters of the first network and the network parameters of the second network meeting a selective sharing condition may be set, and the selective sharing condition is used for indicating shared network parameters between the first network and the second network, and is used for indicating independent network parameters between the first network and the second network. Specifically, the network parameters include a feature extraction parameter and a feature transformation parameter; the selective sharing condition, when being used for indicating the shared network parameters between the first network and the second network, is specifically used for indicating that the feature transformation parameter of the first network and the feature transformation parameter of the second network are the shared network parameters, that is, the feature transformation parameter of the first network and the feature transformation parameter of the second network are the same network parameter; and the selective sharing condition, when being used for indicating the independent network parameters between the first network and the second network, is specifically used for indicating that the feature extraction parameter of the first network and the feature extraction parameter of the second network are the independent network parameters, that is, the feature extraction parameter of the first network and the feature extraction parameter of the second network are different network parameters. In some embodiments, the network parameters further include a feature reconstruction parameter; and the selective sharing condition, when being used for indicating the independent network parameters between the first network and the second network, is further used for indicating that the feature reconstruction parameter of the first network and the feature reconstruction parameter of the second network are the independent network parameters, that is, the feature reconstruction parameter of the first network and the feature reconstruction parameter of the second network are different network parameters.

The selective sharing condition being specifically used for indicating that the feature transformation parameter of the first network and the feature transformation parameter of the second network are the shared network parameters may include the following two implementations: (1) when the quantity of the feature transformation parameter is greater than 1, a plurality of feature transformation parameters of the first network and a plurality of feature transformation parameters of the second network are the shared network parameters, and each of the feature transformation parameters of the first network is an independent network parameter and each of the feature transformation parameters of the second network is an independent network parameter, as shown in the image on the right side in FIG. 5A; and (2) when the quantity of the feature transformation parameter is greater than 1, a plurality of feature transformation parameters of the first network and a plurality of feature transformation parameters of the second network are the shared network parameters, and each of the feature transformation parameters of the first network is a shared network parameter and each of the feature transformation parameters of the second network is a shared network parameter, as shown in the image on the right side in FIG. 5B.

In one embodiment consistent with the present disclosure, the image processing model at least includes the first network with the first scale and the second network with the second scale. Because there are shared network parameters and independent network parameters between the first network and the second network, when performing sharpness restoration on the blurry image, the image processing model can learn more image features in the blurry image to obtain a more accurate restored image. The network parameters of the first network and/or the network parameters of the second network are updated according to the more accurate restored image and the clear image, which may improve the deblurring performance of the trained image processing model. In addition, because there are shared network parameters between the first network and the second network, the quantity of parameters of the image processing model may be reduced, and the efficiency of model training is improved. Moreover, by using the corresponding clear image and blurry image to perform end-to-end training and learning on the image processing model, there is no need to segment the blurry image into blurry regions in movement, and there is no need to make any assumption on the blurry image, which may further improve the deblurring performance of the trained image processing model and the efficiency of model training.

Figure 6A:
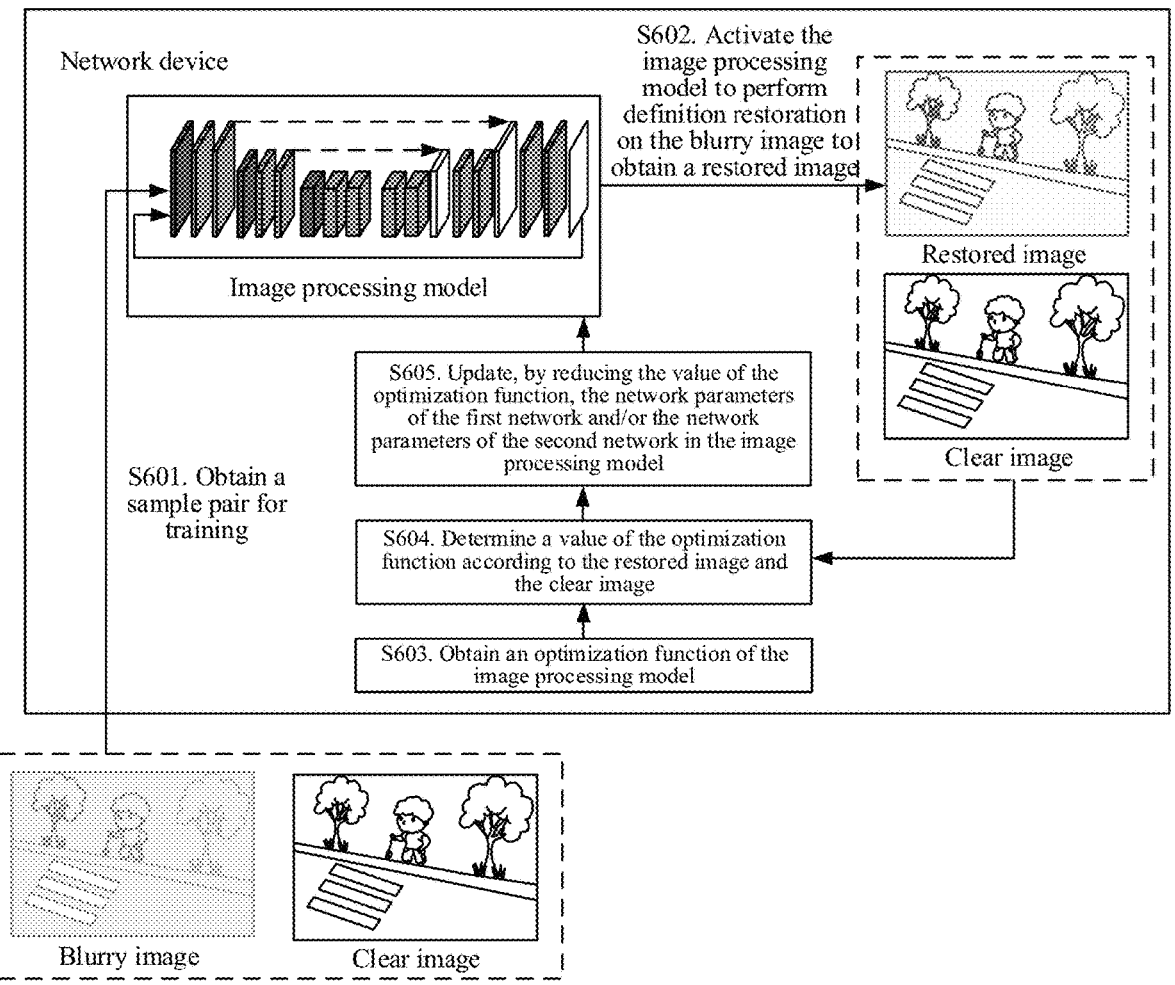
FIG. 6A is a schematic flowchart of a training method for an image processing model according to another embodiment of this application.

FIG. 6A is a schematic flowchart of another training method for an image processing model for processing blurry images according to an embodiment of this application. The training method for an image processing model may be performed by a network device. Referring to FIG. 6A, the training method for an image processing model may include the following steps S601 to S605:

S601. Obtain a sample pair for training, the sample pair including a clear image and a blurry image corresponding to the clear image.

The network device may obtain a large quantity of sample pairs and perform a subsequent model training update operation on the image processing model by using the large quantity of sample pairs. In one embodiment, because the production of a blurry image is usually caused by camera movement during recording or object movement in a recording scene, and is essentially because a shutter speed of a camera is not fast enough. As a result, the camera movement or the object movement in the recording scene causes a sensor of the camera to acquire not only the luminance at a certain fixed location, but also an integral of all luminance at related locations within a period of time in which a shutter is enabled and then disabled, resulting in image blurring. However, studies show that the integral of all luminance at related locations in consecutive frames of images captured by the camera may be approximately the summation of adjacent consecutive images.

Figure 6B:
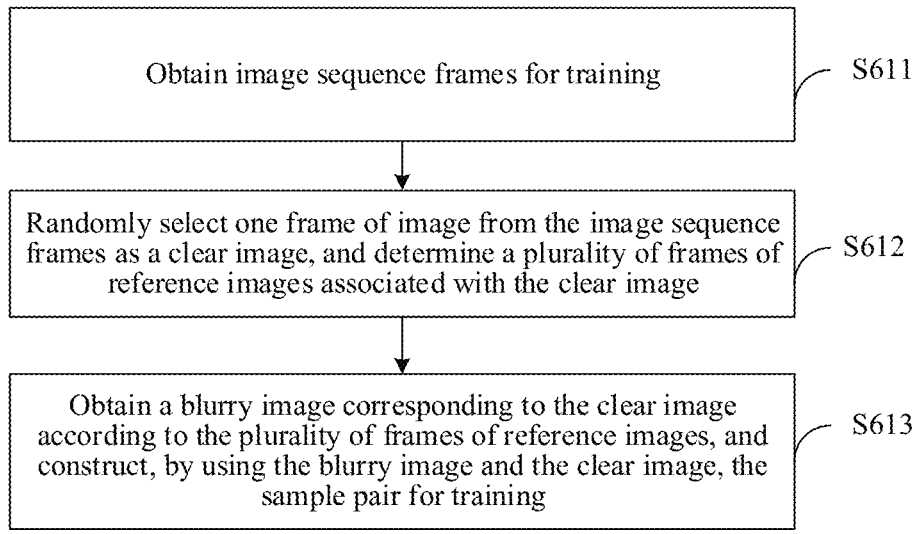
FIG. 6B is a flowchart of a method for obtaining a sample pair for training according to an embodiment of this application.

FIG. 6B is a flowchart of a method for obtaining a sample pair for training according to an embodiment of this application. As shown in FIG. 6, the method for obtaining a sample pair for training may specifically include the following steps S611 to S613:

Step S611. Obtain image sequence frames for training.

In some embodiments, the image sequence frames may be obtained by acquiring, by using an action camera (for example, a GoPro high-speed camera) and a high-speed mode of a network device, a large number of videos, and performing image frame analysis on the acquired videos. The videos may be high-speed videos at 240 frames per second, high-speed videos at 120 frames per second, or the like.

Step S612. Select or randomly select one frame of image from the image sequence frames as a clear image, and determine a plurality of frames of reference images associated with the clear image.

In some embodiments, the reference image being associated with the clear image refers to: a difference between a frame sequence number of the reference image and a frame sequence number of the clear image being less than a preset difference. For example, a frame sequence number of the clear image is 5, that is, the clear image is a $5^{th}$ frame of image in the image sequence frames. If the preset difference is 3, a $3^{rd}$ frame of image, a $4^{th}$ frame of image, a $6^{th}$ frame of image, and a $7^{th}$ frame of image in the image sequence frames may all be used as the reference images.

Step S613. Obtain a blurry image corresponding to the clear image according to the plurality of frames of reference images, and construct, by using the blurry image and the clear image, the sample pair for training.

In some embodiments, an implementation of the obtaining a blurry image corresponding to the clear image according to the plurality of frames of reference images may be: superimposing and averaging the plurality of frames of reference images to obtain the blurry image corresponding to the clear image.

S602. Activate the image processing model to perform sharpness restoration on the blurry image to obtain a restored image.

In one embodiment consistent with the present disclosure, the image processing model at least includes a first network and a second network; the first network corresponds to a first scale, and the second network corresponds to a second scale; and values of the first scale and the second scale are different. As can be learned from the foregoing, the networks with different scales may perform sharpness restoration on blurry images with different sharpness.

Figure 6C:
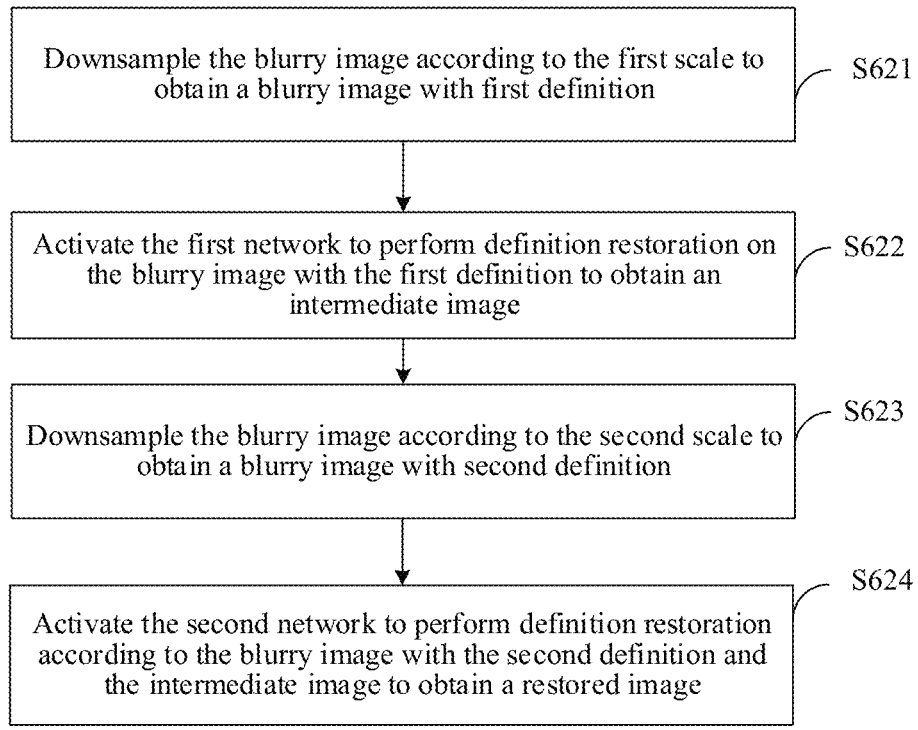
FIG. 6C is a flowchart of a method for activating an image processing model to perform sharpness restoration on a blurry image in step S602 according to an embodiment of this application.

FIG. 6C is a flowchart of a method for activating an image processing model to perform sharpness restoration on a blurry image in step S602 according to an embodiment of this application. As shown in FIG. 6C, the method includes the following steps S621 to S624:

Step S621. Downsample the blurry image according to the first scale to obtain a blurry image with first sharpness.

Step S622. Activate the first network to perform sharpness restoration on the blurry image with the first sharpness to obtain an intermediate image.

In some embodiments, the first network may perform sharpness restoration on the blurry image with the first sharpness by using formula 1.4.

$$I_1 = Net_1(B_1; \theta_1, \eta) \quad \text{Formula 1.4}$$

where, $Net_1$ is a function used by the first network to perform sharpness restoration, $B_1$ represents the blurry image with the first sharpness inputted to the first network, $\theta_1$ represents a network parameter, independent of the second network, in the first network, $\eta$ represents a network parameter shared between the first network and the second network, and $I_1$ represents the intermediate image outputted by the first network.

Step S623. Downsample the blurry image according to the second scale to obtain a blurry image with second sharpness.

Step S624. Activate the second network to perform sharpness restoration according to the blurry image with the second sharpness and the intermediate image to obtain a restored image.

In some embodiments, the second network may perform sharpness restoration on the blurry image with the second sharpness and the intermediate image by using formula 1.5.

$$I_2 = Net_2(B_2, I_1; \theta_2, \eta) \quad \text{Formula 1.5}$$

where, $Net_2$ is a function used by the second network to perform sharpness restoration, $B_2$ represents the blurry image with the second sharpness inputted to the second network, $I_1$ represents the intermediate image outputted by the first network, $\theta_2$ represents a network parameter, independent of the first network, in the second network, $\eta$ represents a network parameter shared between the first network and the second network, and $I_2$ represents the restored image outputted by the second network.

When the image processing model includes at least three networks, the networks may be sequentially called to perform sharpness restoration on the blurry image according to a connection order of the image processing model. A first network in the image processing model may perform sharpness restoration by using formula 1.4, any network other than the first network in the image processing model may perform sharpness restoration by using formula 1.6, and an image obtained by performing sharpness restoration by a last network is a restored image.

$$I_i = Net_i(B_i, I_{i-1}; \theta_i, \eta) \quad \text{Formula 1.6}$$

where, $Net_i$ is a function used by an $i^{th}$ network to perform sharpness restoration, $B_i$ represents a blurry image with $i^{th}$ sharpness inputted to the $i^{th}$ network, $\theta_2$ represents a network parameter, independent of other networks with different scales, in the $i^{th}$ network, $\eta$ represents a network parameter shared between the networks, $I_{i-1}$ represents an intermediate image outputted by an $(i-1)^{th}$ network, and $I_i$ represents an intermediate image outputted by the $i^{th}$ network.

S603. Obtain an optimization function of the image processing model.

S604. Determine a value of the optimization function according to the restored image and the clear image.

S605. Update, by reducing the value of the optimization function, the network parameters of the first network and/or the network parameters of the second network in the image processing model, to obtain a trained image processing model.

The network device may perform the foregoing steps S601 and S602 to obtain restored images and clear images of a large quantity of sample pairs, and perform steps S603 to S605 after obtaining a large quantity of pairs of restored images and clear images. In steps S603 to S605, the optimization function of the image processing model may be shown as formula 1.2:

$$f(\theta, \eta) = \frac{1}{2N} \sum_{k=1}^{N} \sum_{i=1}^{S} \frac{1}{T_i} \|F_i(B_i^k; \theta_i, \eta) - L_i^k\|_2^2 \qquad \text{Formula 1.2}$$

where, N represents the quantity of the sample pairs, $B_i^k$ and $L_i^k$ respectively represent the blurry image and the clear image in a $k^{th}$ sample pair at scale i, S represents the total quantity of scales in the image processing model, $\theta_i$ represents an independent network parameter in a network corresponding to the scale i, $\eta$ represents a shared network parameter, $T_i$ represents the total quantity of pixels of the image at the scale i, $F_i$ and represents a function for performing sharpness restoration on the blurry image $B_i^k$.

After the optimization function is obtained, the restored image and the clear image may be substituted into the optimization function to determine the value of the optimization function, and then the network parameters of the first network and/or the network parameters of the second network in the image processing model are continuously updated by reducing the value of the optimization function, until the value of the optimization function is minimized, and the image processing model is in a converged state. The image processing model may further include other networks different from the first network and the second network. Then, after the value of the optimization function is determined, network parameters of the other networks in the image processing model may be further continuously updated by reducing the value of the optimization function.

In one embodiment consistent with the present disclosure, the image processing model for processing blurry images at least includes the first network with the first scale and the second network with the second scale. Because there are shared network parameters and independent network parameters between the first network and the second network, when performing sharpness restoration on the blurry image, the image processing model can learn more image features in the blurry image to obtain a more accurate restored image. The network parameters of the first network and/or the network parameters of the second network are updated according to the more accurate restored image and the clear image, which may improve the deblurring performance of the trained image processing model. In addition, because there are shared network parameters between the first network and the second network, the quantity of parameters of the image processing model may be reduced, and the efficiency of model training is improved. Moreover, by using the corresponding clear image and blurry image to perform end-to-end training and learning on the image processing model, there is no need to segment the blurry image into blurry regions in movement, and there is no need to make any assumption on the blurry image, which may further improve the deblurring performance of the trained image processing model and the efficiency of model training.

Figure 3A:
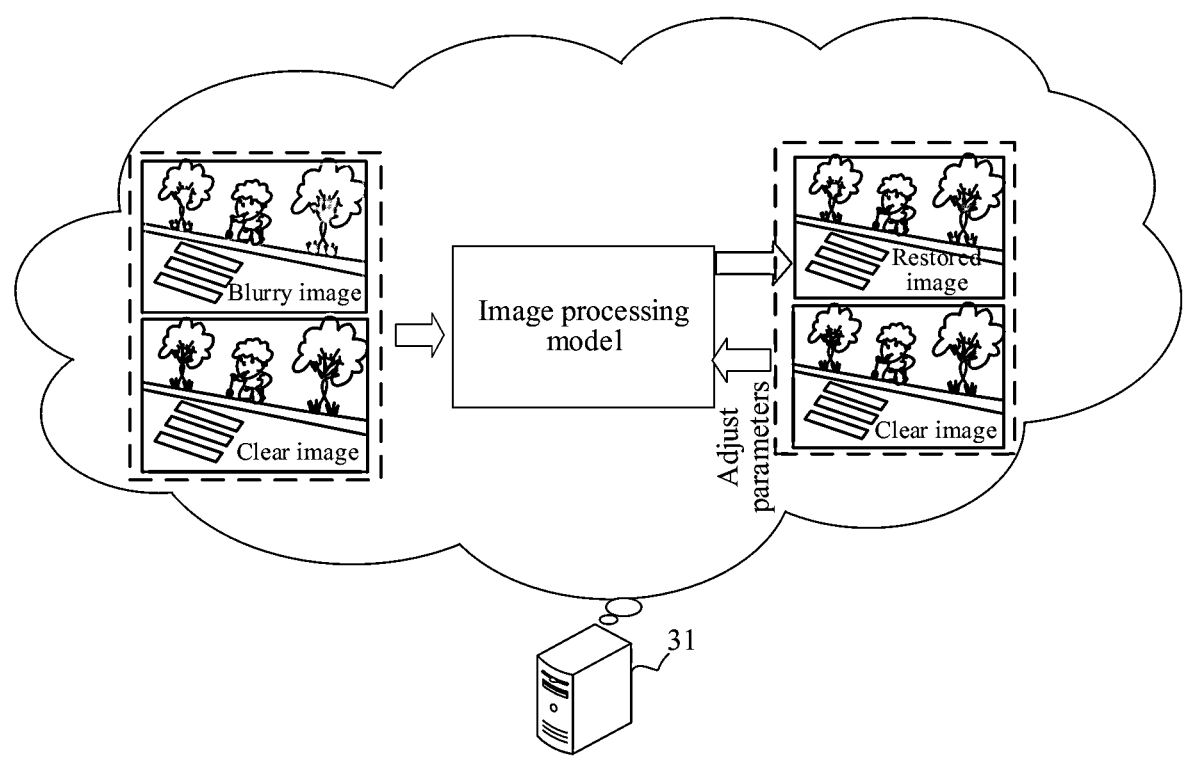
FIG. 3A is a schematic diagram of a scenario of a training method for an image processing model according to an embodiment of this application.
Figure 3B:
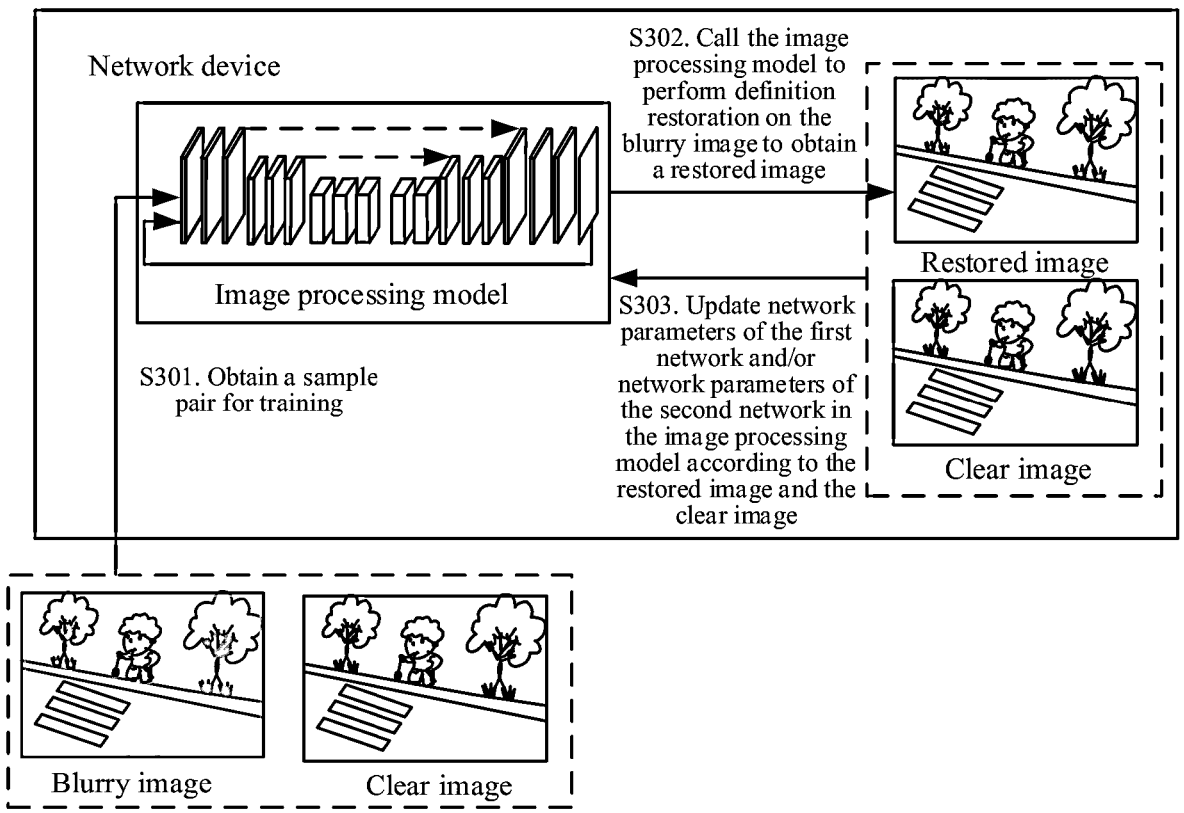
FIG. 3B is a schematic flowchart of a training method for an image processing model according to an embodiment of this application.
Figure 3C:
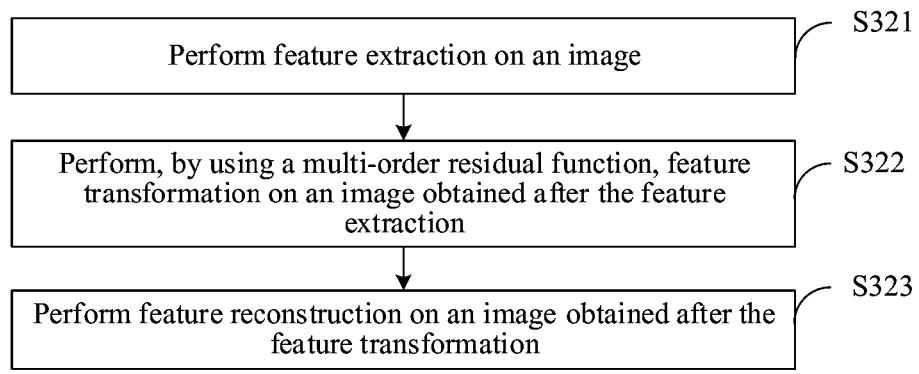
FIG. 3C is a flowchart of sharpness restoration according to an embodiment of this application.
Figure 7:
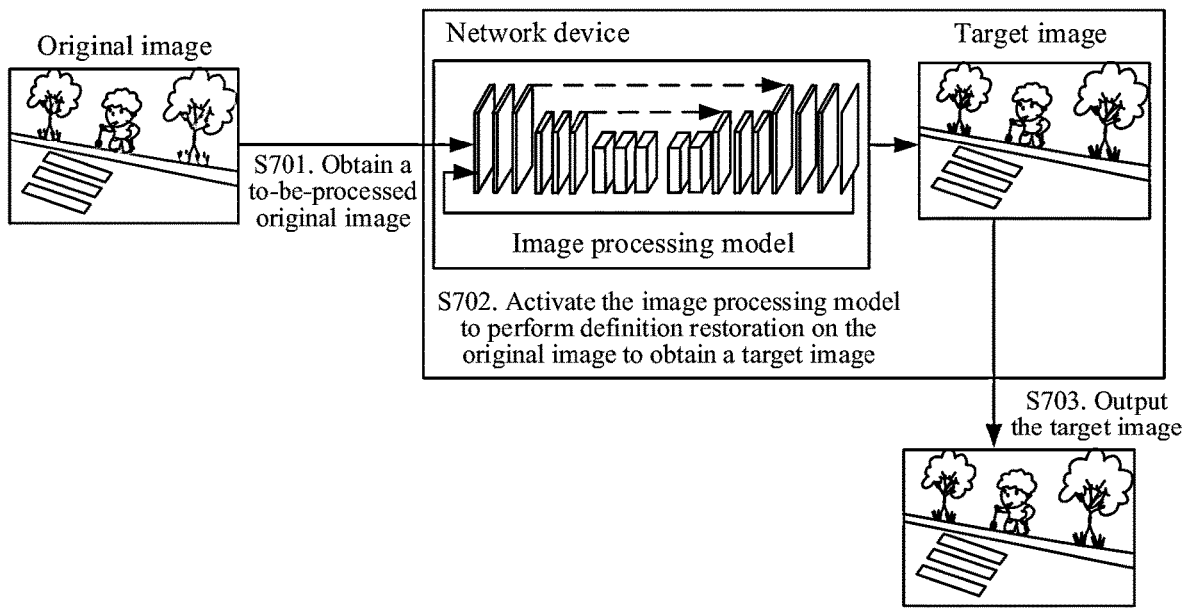
FIG. 7 is a schematic flowchart of an image processing method according to an embodiment of this application.

Based on the foregoing related description of the image processing model, an embodiment of this application further provides an image processing method, and the image processing method may be performed by the network device in FIG. 3A. Referring to FIG. 7, the image processing method may include the following steps S701 to S703:

S701. Obtain a to-be-processed original image.

The sharpness of the original image is less than a preset threshold. A to-be-processed original image may be obtained using the following two methods:

(1) Actively obtain a to-be-processed original image.

Specifically, when a camera assembly is used for image capture, if the network device detects that the camera assembly is in a dynamic scene or a relatively dark environment, whether the sharpness of the image captured by the camera assembly is less than the preset threshold may be actively detected; and if the sharpness is less than the preset threshold, the network device may actively use the image captured by the camera assembly as the to-be-processed original image. In one example, when the camera assembly of the network device records an environmental condition in a certain region, if the network device determines that there is usually a flow of people or vehicles in the region according to historical environmental data of the region, it may be considered that the camera assembly is in the dynamic environment. In this case, whether the sharpness of the image captured by the camera assembly is less than the preset threshold may be actively detected; and if the sharpness is less than the preset threshold, the network device may actively use the image captured by the camera assembly as the to-be-processed original image. In another example, when the camera assembly of the network device captures an image, if the network device detects that the light value of the environment in which the camera assembly is located is less than a preset light value according to a light sensor or the camera assembly, it may be considered that the camera assembly is in the relatively dark environment. In this case, whether the sharpness of the image captured by the camera assembly is less than the preset threshold may be actively detected; and if the sharpness is less than the preset threshold, the network device may actively use the image captured by the camera assembly as the to-be-processed original image.

(2) Obtain a to-be-processed original image according to a user instruction.

In one embodiment, after the network device detects that the user uses the camera assembly of the network device to capture an image, the image captured by the camera assembly may be obtained, and the captured image is displayed in a user interface, for the user to view. If finding that the captured image is not clear and the sharpness thereof is less than the preset threshold, the user may input an image processing instruction to the network device. If the network device receives the image processing instruction, the captured image may be used as the to-be-processed original image. In another embodiment, if the user finds that some historical images in an image gallery of the network device are blurry and the sharpness thereof is less than the preset threshold, the user may also input an image processing instruction to the network device to trigger the network device to obtain the historical images as the to-be-processed original images. The foregoing image processing instruction may be an instruction generated by the user by clicking or pressing an image, or may be an instruction generated by the user by pressing a designated key on the network device, or may be an instruction generated by the user by inputting voice to the network device, or the like.

S702. Activate the image processing model to perform sharpness restoration on the original image to obtain a target image.

The sharpness of the target image is greater than the preset threshold. The sharpness restoration includes: performing feature extraction on an image, performing, by using a multi-order residual function, feature transformation on an image obtained after the feature extraction, and performing feature reconstruction on an image obtained after the feature transformation. Correspondingly, in an implementation process of step S702, the image processing model may be called to first perform feature extraction on the original image to obtain a first image obtained after the feature extraction; feature transformation is then performed on the first image by using a multi-order residual function to obtain a second image obtained after the feature transformation; and finally feature reconstruction is performed on the second image to obtain the target image.

The image processing model herein may be obtained by training by using the training method for an image processing model shown in FIG. 3B or FIG. 6A. The image processing model at least includes a first network and a second network; the first network corresponds to a first scale, and the second network corresponds to a second scale; and network parameters of the first network and network parameters of the second network meet a selective sharing condition, and the selective sharing condition is used for indicating shared network parameters between the first network and the second network, and is used for indicating independent network parameters between the first network and the second network. In one embodiment, the network parameters include a feature extraction parameter and a feature transformation parameter. Correspondingly, the selective sharing condition, when being used for indicating the shared network parameters between the first network and the second network, is specifically used for indicating that the feature transformation parameter of the first network and the feature transformation parameter of the second network are the shared network parameters; and the selective sharing condition, when being used for indicating the independent network parameters between the first network and the second network, is specifically used for indicating that the feature extraction parameter of the first network and the feature extraction parameter of the second network are the independent network parameters. In another embodiment, the network parameters further include a feature reconstruction parameter. Correspondingly, the selective sharing condition, when being used for indicating the independent network parameters between the first network and the second network, is further used for indicating that the feature reconstruction parameter of the first network and the feature reconstruction parameter of the second network are the independent network parameters.

S703. Output the target image.

In one embodiment consistent with the present disclosure, because the image processing model is obtained by training by using the training method for an image processing model shown in FIG. 3B or FIG. 6A, the deblurring performance of the image processing model is good. Therefore, by activating the image processing model to perform sharpness restoration on the original image with low sharpness, the original image may be better deblurred to obtain a relatively clear target image, which may improve the sharpness of the target image and further improve the image quality of the target image.

Figure 8:
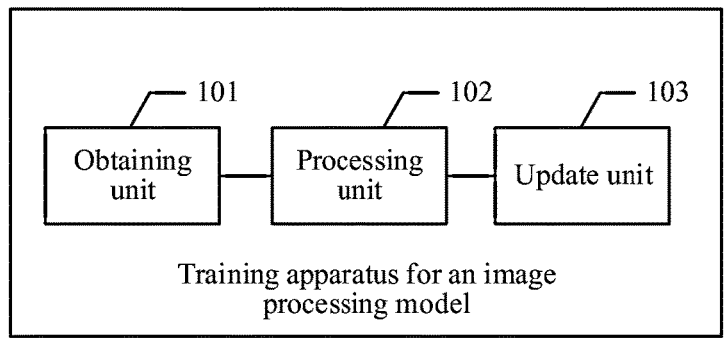
FIG. 8 is a schematic structural diagram of a training apparatus for an image processing model according to an embodiment of this application.

Based on the foregoing description of the embodiment of the training method for an image processing model, an embodiment of this application further discloses a training apparatus for an image processing model for processing blurry images. The image processing model at least includes a first network and a second network; the first network and the second network are codec networks with different scales; the sizes of the scales correspond to the measurements of the sharpness of to-be-processed blurry images; and the training apparatus for an image processing model may be a computer program (including program code) run on a network device. The training apparatus for an image processing model may perform the method shown in FIG. 3B or FIG. 6A. Referring to FIG. 8, the training apparatus for an image processing model may operate the following units:

an obtaining unit 101, configured to obtain a sample pair for training, the sample pair including a clear image and a blurry image corresponding to the clear image; and the sharpness of the clear image being greater than a preset threshold, and the sharpness of the blurry image being less than the preset threshold;

a processing unit 102, configured to activate the image processing model to perform sharpness restoration on the blurry image to obtain a restored image; and an update unit 103, configured to update network parameters of the first network and/or network parameters of the second network in the image processing model according to the restored image and the clear image to obtain a trained image processing model;

the network parameters of the first network and the network parameters of the second network meeting a selective sharing condition, and the selective sharing condition being used for indicating shared network parameters between the first network and the second network, and being used for indicating independent network parameters between the first network and the second network.

In one embodiment, the network parameters include a feature extraction parameter and a feature transformation parameter;

the selective sharing condition, when being used for indicating the shared network parameters between the first network and the second network, is specifically used for indicating that the feature transformation parameter of the first network and the feature transformation parameter of the second network are the shared network parameters; and the selective sharing condition, when being used for indicating the independent network parameters between the first network and the second network, is specifically used for indicating that the feature extraction parameter of the first network and the feature extraction parameter of the second network are the independent network parameters.

In another embodiment, the network parameters further include a feature reconstruction parameter; and the selective sharing condition, when being used for indicating the independent network parameters between the first network and the second network, is further used for indicating that the feature reconstruction parameter of the first network and the feature reconstruction parameter of the second network are the independent network parameters.

In another embodiment, the selective sharing condition being specifically used for indicating that the feature transformation parameter of the first network and the feature transformation parameter of the second network are the shared network parameters includes:

when the quantity of the feature transformation parameter is greater than 1, a plurality of feature transformation parameters of the first network and a plurality of feature transformation parameters of the second network being the shared network parameters, and each of the feature transformation parameters of the first network being an independent network parameter and each of the feature transformation parameters of the second network being an independent network parameter; or when the quantity of the feature transformation parameter is greater than 1, a plurality of feature transformation parameters of the first network and a plurality of feature transformation parameters of the second network being the shared network parameters, and each of the feature transformation parameters of the first network being a shared network parameter and each of the feature transformation parameters of the second network being a shared network parameter.

In another embodiment, the first network corresponds to a first scale, and the second network corresponds to a second scale; and the processing unit 102, when being configured to activate the image processing model to perform sharpness restoration on the blurry image to obtain a restored image, is specifically configured to:

downsample the blurry image according to the first scale to obtain a blurry image with first sharpness;

activate the first network to perform sharpness restoration on the blurry image with the first sharpness to obtain an intermediate image;

downsample the blurry image according to the second scale to obtain a blurry image with second sharpness; and activate the second network to perform sharpness restoration according to the blurry image with the second sharpness and the intermediate image to obtain a restored image.

In another embodiment, the sharpness restoration includes: performing feature extraction on an image, performing, by using a multi-order residual function, feature transformation on an image obtained after the feature extraction, and performing feature reconstruction on an image obtained after the feature transformation.

In another embodiment, the update unit 103, when being configured to update network parameters of the first network and/or network parameters of the second network in the image processing model according to the restored image and the clear image, is specifically configured to:

obtain an optimization function of the image processing model;

determine a value of the optimization function according to the restored image and the clear image; and update, according to the principle of reducing the value of the optimization function, the network parameters of the first network and/or the network parameters of the second network in the image processing model.

In another embodiment, the obtaining unit 101, when being configured to obtain a sample pair for training, is specifically configured to:

obtain image sequence frames for training, the image sequence frames including at least two frames of images;

select or randomly select one frame of image from the image sequence frames as a clear image, and determine a plurality of frames of reference images associated with the clear image; and obtain a blurry image corresponding to the clear image according to the plurality of frames of reference images, and construct, by using the blurry image and the clear image, the sample pair for training.

In another embodiment, the obtaining unit 101, when being configured to obtain a blurry image corresponding to the clear image according to the plurality of frames of reference images, is specifically configured to:

superimpose and average the plurality of frames of reference images to obtain the blurry image corresponding to the clear image.

According to an embodiment of this application, the steps in the method shown in FIG. 3B or FIG. 6A may be performed by the units of the training apparatus for an image processing model shown in FIG. 8. In one example, steps S301 to S303 shown in FIG. 3B may be respectively performed by the obtaining unit 101, the processing unit 102, and the update unit 103 shown in FIG. 8. In another example, steps S601 and S602 shown in FIG. 6A may be respectively performed by the obtaining unit 101 and the processing unit 102 shown in FIG. 8, and steps S603 to S605 may be performed by the update unit 103 shown in FIG. 8.

According to another embodiment of this application, the units of the training apparatus for an image processing model for processing blurry images shown in FIG. 8 may be separately or wholly combined into one or several other units, or one (or more) of the units herein may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the training apparatus for an image processing model may also include other units. In an actual application, the functions may also be cooperatively implemented by other units and may be cooperatively implemented by a plurality of units.

According to another embodiment of this application, a computer program (including program code) that can perform the steps in the corresponding method shown in FIG. 3B or FIG. 6A may be run on a general computing device, such as a computer, which includes processing elements and storage elements such as a central processing unit (CPU), a random access memory (RAM), and a read-only memory (ROM), to construct the training apparatus for an image processing model shown in FIG. 8 and implement the training method for an image processing model in the embodiments of this application. The computer program may be recorded on, for example, a computer-readable recording medium, and may be loaded into the foregoing computing device by using the computer-readable recording medium and run on the computing device.

In one embodiment consistent with the present disclosure, the image processing model for processing blurry images at least includes the first network with the first scale and the second network with the second scale. Because there are shared network parameters and independent network parameters between the first network and the second network, when performing sharpness restoration on the blurry image, the image processing model can learn more image features in the blurry image to obtain a more accurate restored image. The network parameters of the first network and/or the network parameters of the second network are updated according to the more accurate restored image and the clear image, which may improve the deblurring performance of the trained image processing model. In addition, because there are shared network parameters between the first network and the second network, the quantity of parameters of the image processing model may be reduced, and the efficiency of model training is improved. Moreover, by using the corresponding clear image and blurry image to perform end-to-end training and learning on the image processing model, there is no need to segment the blurry image into blurry regions in movement, and there is no need to make any assumption on the blurry image, which may further improve the deblurring performance of the trained image processing model and the efficiency of model training.

Figure 9:
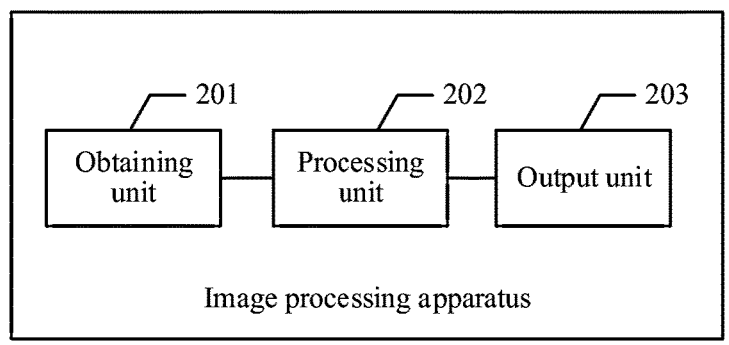
FIG. 9 is a schematic structural diagram of an image processing apparatus according to an embodiment of this application.

Based on the foregoing description of the embodiment of the image processing method, an embodiment of this application further discloses an image processing apparatus. The image processing apparatus may be a computer program (including program code) run on a network device. The image processing apparatus may perform the method shown in FIG. 7. Referring to FIG. 9, the image processing apparatus may operate the following units:

an obtaining unit 201, configured to obtain a to-be-processed original image, the sharpness of the original image being less than a preset threshold;

a processing unit 202, configured to activate an image processing model for processing blurry images to perform sharpness restoration on the original image to obtain a target image, the sharpness of the target image being greater than the preset threshold, the image processing model at least including a first network and a second network; the first network and the second network being codec networks with different scales; the sizes of the scales corresponding to the measurements of the sharpness of to-be-processed blurry images; and the network parameters of the first network and the network parameters of the second network meeting a selective sharing condition, and the selective sharing condition being used for indicating shared network parameters between the first network and the second network, and being used for indicating independent network parameters between the first network and the second network; and an output unit 203, configured to output the target image.

In one embodiment, the network parameters include a feature extraction parameter and a feature transformation parameter;

the selective sharing condition, when being used for indicating the shared network parameters between the first network and the second network, is specifically used for indicating that the feature transformation parameter of the first network and the feature transformation parameter of the second network are the shared network parameters; and the selective sharing condition, when being used for indicating the independent network parameters between the first network and the second network, is specifically used for indicating that the feature extraction parameter of the first network and the feature extraction parameter of the second network are the independent network parameters.

In another embodiment, the network parameters further include a feature reconstruction parameter; and the selective sharing condition, when being used for indicating the independent network parameters between the first network and the second network, is further used for indicating that the feature reconstruction parameter of the first network and the feature reconstruction parameter of the second network are the independent network parameters.

According to an embodiment of this application, the steps in the method shown in FIG. 7 may be performed by the units of the image processing apparatus shown in FIG. 9. Specifically, steps S701 to S703 shown in FIG. 7 may be respectively performed by the obtaining unit 201, the processing unit 202, and the output unit 203 shown in FIG. 9. According to another embodiment of this application, the units of the image processing apparatus shown in FIG. 9 may be separately or wholly combined into one or several other units, or one (or more) of the units herein may further be divided into a plurality of units of smaller functions. In this way, same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the image processing apparatus may also include other units. In an actual application, the functions may also be cooperatively implemented by other units and may be cooperatively implemented by a plurality of units. According to another embodiment of this application, a computer program (including program code) that can perform the steps in the corresponding method shown in FIG. 7 may be run on a general computing device, such as a computer, which includes processing elements and storage elements such as a central processing unit (CPU), a random access memory (RAM), and a read-only memory (ROM), to construct the image processing apparatus shown in FIG. 9 and implement the image processing method in the embodiments of this application. The computer program may be recorded on, for example, a computer-readable recording medium, and may be loaded into the foregoing computing device by using the computer-readable recording medium and run on the computing device.

In one embodiment consistent with the present disclosure, because the image processing model is obtained by training by using the training method for an image processing model shown in FIG. 3B or FIG. 6A, the deblurring performance of the image processing model is good. Therefore, by activating the image processing model to perform sharpness restoration on the original image with low sharpness, the original image may be better deblurred to obtain a relatively clear target image, which may improve the sharpness of the target image and further improve the image quality of the target image.

Figure 10:
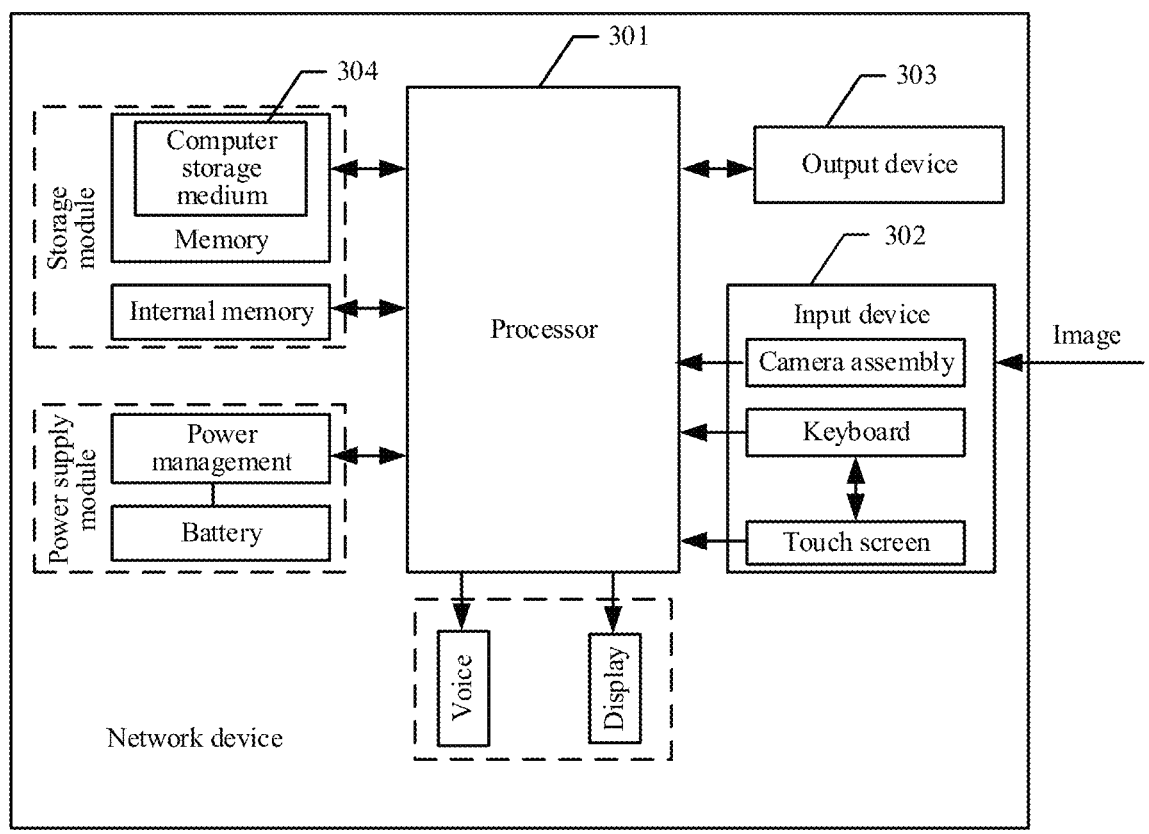
FIG. 10 is a schematic structural diagram of a network device according to an embodiment of this application.

Based on the descriptions of the foregoing method embodiments and apparatus embodiments, an embodiment of this application further provides a network device. Referring to FIG. 10, the network device at least includes a processor 301, an input device 302, an output device 303, and a computer storage medium 304. The input device 302 may further include a camera assembly, and the camera assembly may be configured to acquire images. The camera assembly may be an assembly configured on the network device when the network device leaves the factory, or may be an external assembly connected to the network device. In some embodiments, the network device may be further connected to other devices to receive images transmitted by the other devices.

The computer storage medium 304 may be stored in a memory of the network device. The computer storage medium 304 is configured to store a computer program. The computer program includes program instructions. The processor 301 is configured to execute the program instructions stored in the computer storage medium 304. The processor 301 (or referred to as a central processing unit (CPU)) is a computing core and a control core of the network device, is suitable for implementing one or more instructions, and is specifically suitable for loading and executing one or more instructions to implement a corresponding method procedure or a corresponding function. In an embodiment, the processor 301 in the embodiments of this application may be configured to perform a series of training on the image processing model for processing blurry images, including: obtaining a sample pair for training, the sample pair including a clear image and a blurry image corresponding to the clear image; and the sharpness of the clear image being greater than a preset threshold, and the sharpness of the blurry image being less than the preset threshold; activating the image processing model to perform sharpness restoration on the blurry image to obtain a restored image; and updating network parameters of the first network and/or network parameters of the second network in the image processing model according to the restored image and the clear image; the network parameters of the first network and the network parameters of the second network meeting a selective sharing condition, and the selective sharing condition being used for indicating shared network parameters between the first network and the second network, and being used for indicating independent network parameters between the first network and the second network. In another embodiment, the processor 301 in the embodiments of this application may be further configured to perform a series of image processing on the original image, including: obtaining a to-be-processed original image, the sharpness of the original image being less than a preset threshold; and activating the image processing model to perform sharpness restoration on the original image to obtain a target image, the sharpness of the target image being greater than the preset threshold.

An embodiment of this application further provides a computer storage medium (memory), and the computer storage medium is a memory device in the network device and is configured to store programs and data. It may be understood that the computer storage medium herein may include an internal storage medium in the network device and certainly may also include an extended storage medium supported by the network device. The computer storage medium provides storage space, and the storage space stores an operating system of the network device. In addition, the storage space further stores one or more instructions suitable for being loaded and executed by the processor 301. The instructions may be one or more computer programs (including program code). The computer storage medium herein may be a high-speed RAM or a non-volatile memory, for example, at least one magnetic disk memory. In some embodiments, the computer storage medium may be at least one computer storage medium located away from the foregoing processor.

In an embodiment, one or more first instructions stored in the computer storage medium may be loaded and executed by the processor 301 to implement corresponding steps of the method in the foregoing embodiments related to training of the image processing model. The image processing model at least includes a first network and a second network; the first network and the second network are codec networks with different scales; and the sizes of the scales correspond to the measurements of the sharpness of to-be-processed blurry images. In an implementation, the one or more first instructions in the computer storage medium are loaded by the processor 301 to perform the following steps:

obtaining a sample pair for training, the sample pair including a clear image and a blurry image corresponding to the clear image; and the sharpness of the clear image being greater than a preset threshold, and the sharpness of the blurry image being less than the preset threshold;

activating the image processing model to perform sharpness restoration on the blurry image to obtain a restored image; and updating network parameters of the first network and/or network parameters of the second network in the image processing model according to the restored image and the clear image;

the network parameters of the first network and the network parameters of the second network meeting a selective sharing condition, and the selective sharing condition being used for indicating shared network parameters between the first network and the second network, and being used for indicating independent network parameters between the first network and the second network.

In one embodiment, the network parameters include a feature extraction parameter and a feature transformation parameter;

the selective sharing condition, when being used for indicating the shared network parameters between the first network and the second network, is specifically used for indicating that the feature transformation parameter of the first network and the feature transformation parameter of the second network are the shared network parameters; and the selective sharing condition, when being used for indicating the independent network parameters between the first network and the second network, is specifically used for indicating that the feature extraction parameter of the first network and the feature extraction parameter of the second network are the independent network parameters.

In another embodiment, the network parameters further include a feature reconstruction parameter; and the selective sharing condition, when being used for indicating the independent network parameters between the first network and the second network, is further used for indicating that the feature reconstruction parameter of the first network and the feature reconstruction parameter of the second network are the independent network parameters.

In another embodiment, the selective sharing condition being specifically used for indicating that the feature transformation parameter of the first network and the feature transformation parameter of the second network are the shared network parameters includes:

when the quantity of the feature transformation parameter is greater than 1, a plurality of feature transformation parameters of the first network and a plurality of feature transformation parameters of the second network being the shared network parameters, and each of the feature transformation parameters of the first network being an independent network parameter and each of the feature transformation parameters of the second network being an independent network parameter; or when the quantity of the feature transformation parameter is greater than 1, a plurality of feature transformation parameters of the first network and a plurality of feature transformation parameters of the second network being the shared network parameters, and each of the feature transformation parameters of the first network being a shared network parameter and each of the feature transformation parameters of the second network being a shared network parameter.

In another embodiment, the first network corresponds to a first scale, and the second network corresponds to a second scale; and when the image processing model is called to perform sharpness restoration on the blurry image to obtain a restored image, the one or more first instructions are loaded by the processor 301 to perform:

downsampling the blurry image according to the first scale to obtain a blurry image with first sharpness;

activating the first network to perform sharpness restoration on the blurry image with the first sharpness to obtain an intermediate image;

downsampling the blurry image according to the second scale to obtain a blurry image with second sharpness; and activating the second network to perform sharpness restoration according to the blurry image with the second sharpness and the intermediate image to obtain a restored image.

In another embodiment, the sharpness restoration includes: performing feature extraction on an image, performing, by using a multi-order residual function, feature transformation on an image obtained after the feature extraction, and performing feature reconstruction on an image obtained after the feature transformation.

In another embodiment, when network parameters of the first network and/or network parameters of the second network in the image processing model are updated according to the restored image and the clear image, the one or more first instructions are loaded by the processor 301 to perform:

obtaining an optimization function of the image processing model;

determining a value of the optimization function according to the restored image and the clear image; and updating, according to the principle of reducing the value of the optimization function, the network parameters of the first network and/or the network parameters of the second network in the image processing model.

In another embodiment, when a sample pair for training is obtained, the one or more first instructions are loaded by the processor 301 to perform:

obtaining image sequence frames for training, the image sequence frames including at least two frames of images;

selecting one frame of image from the image sequence frames as a clear image, and determining a plurality of frames of reference images associated with the clear image; and obtaining a blurry image corresponding to the clear image according to the plurality of frames of reference images, and constructing, by using the blurry image and the clear image, the sample pair for training.

In another embodiment, when a blurry image corresponding to the clear image is obtained according to the plurality of frames of reference images, the one or more first instructions are loaded by the processor 301 to perform:

superimposing and averaging the plurality of frames of reference images to obtain the blurry image corresponding to the clear image.

In another embodiment, one or more second instructions stored in the computer storage medium may be loaded and executed by the processor 301 to implement corresponding steps of the method in the foregoing embodiments related to image processing. In an implementation, the one or more second instructions in the computer storage medium are loaded by the processor 301 to perform the following steps:

obtaining a to-be-processed original image, the sharpness of the original image being less than a preset threshold;

activating an image processing model to perform sharpness restoration on the original image to obtain a target image, the sharpness of the target image being greater than the preset threshold, the image processing model at least including a first network and a second network; the first network corresponding to a first scale, and the second network corresponding to a second scale; and the network parameters of the first network and the network parameters of the second network meeting a selective sharing condition, and the selective sharing condition being used for indicating shared network parameters between the first network and the second network, and being used for indicating independent network parameters between the first network and the second network; and outputting the target image.

In one embodiment, the network parameters include a feature extraction parameter and a feature transformation parameter;

the selective sharing condition, when being used for indicating the shared network parameters between the first network and the second network, is specifically used for indicating that the feature transformation parameter of the first network and the feature transformation parameter of the second network are the shared network parameters; and the selective sharing condition, when being used for indicating the independent network parameters between the first network and the second network, is specifically used for indicating that the feature extraction parameter of the first network and the feature extraction parameter of the second network are the independent network parameters.

In another embodiment, the network parameters further include a feature reconstruction parameter; and the selective sharing condition, when being used for indicating the independent network parameters between the first network and the second network, is further used for indicating that the feature reconstruction parameter of the first network and the feature reconstruction parameter of the second network are the independent network parameters.

In one embodiment consistent with the present disclosure, the image processing model for processing blurry images at least includes the first network with the first scale and the second network with the second scale. Because there are shared network parameters and independent network parameters between the first network and the second network, when performing sharpness restoration on the blurry image, the image processing model can learn more image features in the blurry image to obtain a more accurate restored image. The network parameters of the first network and/or the network parameters of the second network are updated according to the more accurate restored image and the clear image, which may improve the deblurring performance of the trained image processing model. In addition, because there are shared network parameters between the first network and the second network, the quantity of parameters of the image processing model may be reduced, and the efficiency of model training is improved. Moreover, by using the corresponding clear image and blurry image to perform end-to-end training and learning on the image processing model, there is no need to segment the blurry image into blurry regions in movement, and there is no need to make any assumption on the blurry image, which may further improve the deblurring performance of the trained image processing model and the efficiency of model training.

The term unit, and other similar terms such as subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A training method for an image processing model for processing blurry images, performed by a network device, the image processing model comprising a first network and a second network; the first network and the second network being codec networks with different scales; the sizes of the scales corresponding to the measurements of the sharpness of to-be-processed blurry images; and the method comprising:

obtaining a sample pair for training, the sample pair comprising a clear image and a blurry image corresponding to the clear image; and the sharpness of the clear image being greater than a preset threshold, and the sharpness of the blurry image being less than the preset threshold;

activating the image processing model to perform sharpness restoration on the blurry image to obtain a restored image; and updating network parameters of the first network and network parameters of the second network in the image processing model according to the restored image and the clear image to obtain a trained image processing model;

wherein the network parameters of the first network and the network parameters of the second network meet a selective sharing condition, and the selective sharing condition indicates the network parameters between the first network and the second network are shared or independent.

2. The method according to claim 1, wherein the network parameters comprise a feature extraction parameter and a feature transformation parameter;

the selective sharing condition, when indicating the network parameters between the first network and the second network are shared, indicate that the feature transformation parameter of the first network and the feature transformation parameter of the second network are the shared network parameters; and the selective sharing condition, when indicating the network parameters between the first network and the second network are independent, indicate that the feature extraction parameter of the first network and the feature extraction parameter of the second network are the independent network parameters.

3. The method according to claim 2, wherein the network parameters further comprise a feature reconstruction parameter; and the selective sharing condition, when being used for indicating the independent network parameters between the first network and the second network, indicates that the feature reconstruction parameter of the first network and the feature reconstruction parameter of the second network are the independent network parameters.

4. The method according to claim 2, wherein the selective sharing condition indicates that the feature transformation parameter of the first network and the feature transformation parameter of the second network are the shared network parameters comprises:

when the quantity of the feature transformation parameter is greater than 1, a plurality of feature transformation parameters of the first network and a plurality of feature transformation parameters of the second network being the shared network parameters, and each of the feature transformation parameters of the first network being an independent network parameter and each of the feature transformation parameters of the second network being an independent network parameter.

5. The method according to claim 2, wherein the selective sharing condition indicates that the feature transformation parameter of the first network and the feature transformation parameter of the second network are the shared network parameters comprises:

when the quantity of the feature transformation parameter is greater than 1, a plurality of feature transformation parameters of the first network and a plurality of feature transformation parameters of the second network being the shared network parameters, and each of the feature transformation parameters of the first network being a shared network parameter and each of the feature transformation parameters of the second network being a shared network parameter.

6. The method according to claim 1, wherein the first network corresponds to a first scale, and the second network corresponds to a second scale; and the activating the image processing model to perform sharpness restoration on the blurry image to obtain a restored image comprises: downsampling the blurry image according to the first scale to obtain a blurry image with first sharpness;

activating the first network to perform sharpness restoration on the blurry image with the first sharpness to obtain an intermediate image;

downsampling the blurry image according to the second scale to obtain a blurry image with second sharpness; and activating the second network to perform sharpness restoration according to the blurry image with the second sharpness and the intermediate image to obtain a restored image.

7. The method according to claim 6, wherein the sharpness restoration comprises:

performing feature extraction on an image, performing, by using a multi-order residual function, feature transformation on an image obtained after the feature extraction, and performing feature reconstruction on an image obtained after the feature transformation.

8. The method according to claim 1, wherein the updating network parameters of the first network and network parameters of the second network in the image processing model according to the restored image and the clear image comprises:

obtaining an optimization function of the image processing model;

determining a value of the optimization function according to the restored image and the clear image; and updating, by reducing the value of the optimization function, the network parameters of the first network and the network parameters of the second network in the image processing model.

9. The method according to claim 1, wherein the obtaining a sample pair for training comprises:

obtaining image sequence frames for training, the image sequence frames comprising at least two frames of images;

randomly selecting one frame of image from the image sequence frames as a clear image, and determining a plurality of frames of reference images associated with the clear image; and obtaining a blurry image corresponding to the clear image according to the plurality of frames of reference images, and constructing, by using the blurry image and the clear image, the sample pair for training.

10. The method according to claim 9, wherein the obtaining a blurry image corresponding to the clear image according to the plurality of frames of reference images comprises:
  superimposing and averaging the plurality of frames of reference images to obtain the blurry image corresponding to the clear image.

11. An image processing method, performed by a network device, the method comprising:
  obtaining a to-be-processed original image, the sharpness of the original image being less than a preset threshold;
  activating an image processing model for processing blurry images to perform sharpness restoration on the original image to obtain a target image, the sharpness of the target image being greater than the preset threshold, the image processing model at least comprising a first network and a second network; the first network and the second network being codec networks with different scales; the sizes of the scales corresponding to the measurements of the sharpness of to-be-processed blurry images; and the network parameters of the first network and the network parameters of the second network meeting a selective sharing condition, and the selective sharing condition indicating the network parameters between the first network and the second network are shared or independent; and
  outputting the target image.

12. The method according to claim 11, wherein the network parameters comprise a feature extraction parameter and a feature transformation parameter;
  the selective sharing condition, when indicating network parameters between the first network and the second network are shared, indicates that the feature transformation parameter of the first network and the feature transformation parameter of the second network are the shared network parameters; and
  the selective sharing condition, when indicating the network parameters between the first network and the second network are independent, indicates that the feature extraction parameter of the first network and the feature extraction parameter of the second network are the independent network parameters.

13. The method according to claim 12, wherein the network parameters further comprise a feature reconstruction parameter; and
  the selective sharing condition, when indicating the network parameters between the first network and the second network are independent, indicates that the feature reconstruction parameter of the first network and the feature reconstruction parameter of the second network are the independent network parameters.

14. A training apparatus for an image processing model for processing blurry images, the image processing model comprising a first network and a second network; the first network and the second network being codec networks with different scales; the sizes of the scales corresponding to the measurements of the sharpness of to-be-processed blurry images; and the apparatus comprising:
  a processor, and
  a memory connected to the processor, the memory storing machine-readable instructions, and the machine-readable instructions being executable by the processor to:
  obtain a sample pair for training, the sample pair comprising a clear image and a blurry image corresponding to the clear image; and the sharpness of the clear image being greater than a preset threshold, and the sharpness of the blurry image being less than the preset threshold;
  activate the image processing model to perform sharpness restoration on the blurry image to obtain a restored image; and
  update network parameters of the first network and network parameters of the second network in the image processing model according to the restored image and the clear image to obtain a trained image processing model;
  wherein the network parameters of the first network and the network parameters of the second network meet a selective sharing condition, and the selective sharing condition indicating the network parameters between the first network and the second network, are shared or independent.

15. The apparatus according to claim 14, wherein the network parameters comprise a feature extraction parameter and a feature transformation parameter;
  the selective sharing condition, when indicating the network parameters between the first network and the second network are shared, indicates that the feature transformation parameter of the first network and the feature transformation parameter of the second network are the shared network parameters; and
  the selective sharing condition, when indicating the network parameters between the first network and the second network are independent, indicates that the feature extraction parameter of the first network and the feature extraction parameter of the second network are the independent network parameters.

16. The apparatus according to claim 15, wherein the network parameters further comprise a feature reconstruction parameter; and
  the selective sharing condition, when indicating the network parameters between the first network and the second network are independent, indicates that the feature reconstruction parameter of the first network and the feature reconstruction parameter of the second network are the independent network parameters.

17. The apparatus according to claim 15, wherein the selective sharing condition being specifically used for indicating that the feature transformation parameter of the first network and the feature transformation parameter of the second network are the shared network parameters comprises:
  when that the quantity of the feature transformation parameter is greater than 1, a plurality of feature transformation parameters of the first network and a plurality of feature transformation parameters of the second network being the shared network parameters, and each of the feature transformation parameters of the first network being an independent network parameter and each of the feature transformation parameters of the second network being an independent network parameter.

18. The apparatus according to claim 15, wherein the selective sharing condition being specifically used for indicating that the feature transformation parameter of the first network and the feature transformation parameter of the second network are the shared network parameters comprises:
  when the quantity of the feature transformation parameter is greater than 1, a plurality of feature transformation parameters of the first network and a plurality of feature transformation parameters of the second network being the shared network parameters, and each of the feature transformation parameters of the first network being a shared network parameter and each of the feature transformation parameters of the second network being a shared network parameter.

19. The apparatus according to claim 14, wherein the first network corresponds to a first scale, and the second network corresponds to a second scale; and the activating the image processing model to perform sharpness restoration on the blurry image to obtain a restored image comprises:

down sampling the blurry image according to the first scale to obtain a blurry image with first sharpness;

activating the first network to perform sharpness restoration on the blurry image with the first sharpness to obtain an intermediate image;

down sampling the blurry image according to the second scale to obtain a blurry image with second sharpness; and activating the second network to perform sharpness restoration according to the blurry image with the second sharpness and the intermediate image to obtain a restored image.

20. The apparatus according to claim 19, wherein the sharpness restoration comprises:

performing feature extraction on an image, performing, by using a multi-order residual function, feature transformation on an image obtained after the feature extraction, and performing feature reconstruction on an image obtained after the feature transformation.

\* \* \* \* \*